(12) United States Patent
Shiraishi et al.

(10) Patent No.: US 11,947,070 B2
(45) Date of Patent: *Apr. 2, 2024

(54) HOUSING DEVICE

(71) Applicant: NEC Corporation, Tokyo (JP)

(72) Inventors: Soma Shiraishi, Tokyo (JP); Katsumi Kikuchi, Tokyo (JP); Takami Sato, Tokyo (JP); Yu Nabeto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/792,224

(22) PCT Filed: Jan. 23, 2020

(86) PCT No.: PCT/JP2020/002308
§ 371 (c)(1),
(2) Date: Jul. 12, 2022

(87) PCT Pub. No.: WO2021/149219
PCT Pub. Date: Jul. 29, 2021

(65) Prior Publication Data
US 2023/0048407 A1 Feb. 16, 2023

(51) Int. Cl.
*G01V 8/20* (2006.01)
*G06V 10/145* (2022.01)
*G06V 10/147* (2022.01)

(52) U.S. Cl.
CPC .............. *G01V 8/20* (2013.01); *G06V 10/145* (2022.01); *G06V 10/147* (2022.01)

(58) Field of Classification Search
CPC ...... G06V 10/145; G06V 10/12; G06V 10/14; G06V 10/147; G01V 8/10; G01V 8/12;
(Continued)

(56) References Cited

U.S. PATENT DOCUMENTS 3,746,863 A * 7/1973 Pronovost ................ G01V 8/20
250/221
4,794,248 A * 12/1988 Gray ........................ B66B 13/26
250/221
(Continued)

FOREIGN PATENT DOCUMENTS

EP        2371754 B1 * 10/2016 ............. B66B 13/26
JP    2005-077130 A       3/2005
(Continued)

OTHER PUBLICATIONS

International Search Report for PCT Application No. PCT/JP2020/002308, dated Mar. 24, 2020.
(Continued)

*Primary Examiner* — John R Lee

(57) ABSTRACT

A housing device (20) includes a housing portion (22), a light source (200), and an optical sensor (300). The housing portion (22) includes a holding body (100). An article is housed in the housing portion (22). The holding body (100) extends in one direction. The light source (200) is attached to the holding body (100) along the one direction. The light source (200) applies light toward at least a part of a space (S) located on a side of the holding body (100) with respect to the one direction of the holding body (100), a front of the space (S), and a back of the space (S). The optical sensor (300) is attached to the holding body (100). At least a part of a visual field of the optical sensor (300) faces in at least a part of the space (S), the front of the space (S), and the back of the space (S).

6 Claims, 20 Drawing Sheets

(58) Field of Classification Search
CPC ... G01V 8/14; G01V 8/16; G01V 8/24; G01V 8/22; G01V 8/20
See application file for complete search history.

(56) References Cited

U.S. PATENT DOCUMENTS

| | | | | |
|---|---|---|---|---|
| 5,420,430 | A * | 5/1995 | Trett | B66B 13/26 250/221 |
| 6,279,687 | B1 * | 8/2001 | Pustelniak | B66B 13/26 49/25 |
| 6,750,439 | B2 * | 6/2004 | Nakazaki | G01V 8/20 250/221 |
| 7,226,025 | B2 * | 6/2007 | Sato | G01J 1/04 248/229.11 |
| 7,362,224 | B2 * | 4/2008 | Zambon | G01K 17/003 374/E17.002 |
| 7,771,080 | B2 * | 8/2010 | Platt | E05F 15/43 362/249.02 |
| 2007/0064424 | A1 | 3/2007 | Platt | |
| 2010/0308222 | A1 * | 12/2010 | Platt | B66B 13/26 362/231 |
| 2015/0144772 | A1 * | 5/2015 | Eble | G01V 8/20 250/208.2 |
| 2016/0139297 | A1 * | 5/2016 | Guldimann | F16P 3/144 250/221 |
| 2023/0048407 | A1 * | 2/2023 | Shiraishi | G01V 8/20 |
| 2023/0051817 | A1 * | 2/2023 | Shiraishi | G06V 10/147 |

FOREIGN PATENT DOCUMENTS

| | | |
|---|---|---|
| JP | 2010-210265 A | 9/2010 |
| JP | 2015-226681 A | 12/2015 |
| JP | 2016-047210 A | 4/2016 |
| JP | 2019-208627 A | 12/2019 |
| WO | 2010/073387 A1 | 7/2010 |
| WO | 2021/149218 A1 | 7/2021 |

OTHER PUBLICATIONS

JP Office Action for JP Application No. 2021-572217, dated Aug. 15, 2023 with English Translation.

* cited by examiner

HOUSING DEVICE

This application is a National Stage Entry of PCT/JP2020/002308 filed on Jan. 23, 2020, the contents of all of which are incorporated herein by reference, in their entirety.

TECHNICAL FIELD

The present invention relates to a housing device.

BACKGROUND ART

In recent years, an object recognition device using various optical sensors such as a capturing unit of a camera and the like has been developed. For example, PTL 1 describes an object recognition device mounted on an automobile. The object recognition device includes a light projection unit and a light reception unit. Infrared light applied from the light projection unit is reflected by a target object present outside the object recognition device, and is received by the light reception unit. Further, PTL 2 describes a photoacoustic imaging device. The photoacoustic imaging device includes a plurality of light source bodies having an elongated shape.

RELATED DOCUMENT

Patent Document

[PTL 1] Japanese Patent Application Publication No. 2005-77130
[PTL 2] Japanese Patent Application Publication No. 2016-47210

SUMMARY OF THE INVENTION

Technical Problem

For example, an object recognition device is used for recognizing various objects, such as a person located near a housing portion such as a shelf in which an article such as a product is housed in a store such as a retail store, and an article such as a product housed in such a housing portion. In this case, an object (for example, an article such as a product, and a person) that is present in a specific region with respect to the housing portion or passes through a specific region with respect to the housing portion is required to be recognized by the object recognition device with high sensitivity.

One example of an object of the present invention is to recognize, with high sensitivity, an object that is present in a specific region with respect to a housing portion or passes through a specific region with respect to the housing portion. Another object of the present invention will become apparent from the description of the present specification.

Solution to Problem

One aspect of the present invention is a housing device including:

a housing portion including a holding body extending in one direction, and in which an article is housed;

a light source that is attached to the holding body along the one direction, and applies light toward at least a part of a space located on a side of the holding body with respect to the one direction of the holding body, a front of the space, and a back of the space; and an optical sensor that is attached to the holding body, and has at least a part of a visual field facing in at least a part of the space, the front of the space, and the back of the space.

Advantageous Effects of Invention

According to the aspect described above of the present invention, an object that is present in a specific region with respect to a housing portion or passes through a specific region with respect to the housing portion is able to be recognized with high sensitivity.

BRIEF DESCRIPTION OF THE DRAWINGS

The above-described object, the other objects, features, and advantages will become more apparent from suitable example embodiment described below and the following accompanying drawings.

DESCRIPTION OF EMBODIMENTS

Hereinafter, example embodiments of the present invention will be described with reference to the drawings. Note

First Example Embodiment

Figure 1:
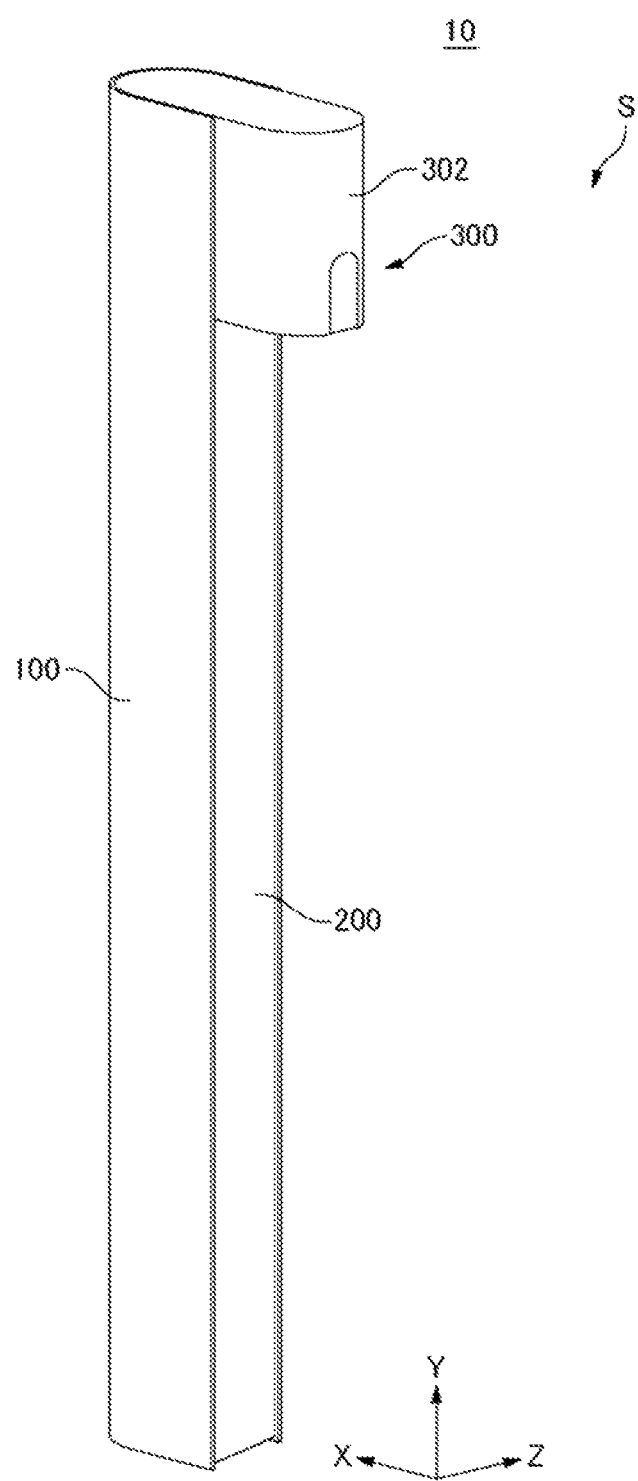
FIG. 1 is a perspective view of an object recognition device according to a first example embodiment.

FIG. 1 is a perspective view of an object recognition device 10 according to a first example embodiment.

In FIG. 1, a first direction X, a second direction Y, and a third direction Z are as follows. The same applies to drawings described later. The first direction X is a width direction (horizontal direction) of a space S located on a side of a holding body 100 described later. A positive direction (direction indicated by an arrow indicating the first direction X) of the first direction X is a direction from the space S toward the holding body 100. A negative direction (direction opposite to the direction indicated by the arrow indicating the first direction X) of the first direction X is a direction from the holding body 100 toward the space S. The second direction Y intersects the first direction X, and is specifically orthogonal to the first direction X. The second direction Y is a height direction (vertical direction) of the space S located on the side of the holding body 100. A positive direction (direction indicated by an arrow indicating the second direction Y) of the second direction Y is an upward direction of the space S. A negative direction (direction opposite to the direction indicated by the arrow indicating the second direction Y) of the second direction Y is a downward direction of the space S. The third direction Z intersects both of the first direction X and the second direction Y, and is specifically orthogonal to both of the first direction X and the second direction Y. The third direction Z is a front-back direction (horizontal direction) of the space S located on the side of the holding body 100. A positive direction (direction indicated by an arrow indicating the third direction Z) of the third direction Z is a direction from the front toward the back of the space S. A negative direction (direction opposite to the direction indicated by the arrow indicating the third direction Z) of the third direction Z is a direction from the back toward the front of the space S.

The first direction X, the second direction Y, and the third direction Z are not limited to the directions described above. The first direction X, the second direction Y, and the third direction Z described above are directions in one example of use of the object recognition device 10 according to the present example embodiment. For example, the object recognition device 10 may be used in such a way that the second direction Y is tilted obliquely from the vertical direction toward the horizontal direction. Further, the object recognition device 10 may be used in such a way that a front-back direction (third direction Z) of the space S is parallel to the vertical direction (both of the first direction X and the second direction Y are parallel to the horizontal direction). Furthermore, the object recognition device 10 may be used in such a way that the first direction X is parallel to the vertical direction and the second direction Y is parallel to the horizontal direction.

An outline of the object recognition device 10 will be described by using FIG. 1. The object recognition device 10 includes the holding body 100, a light source 200, and an optical sensor 300. The holding body 100 extends in one direction (extending direction of the holding body 100: the second direction Y). The light source 200 is attached to the holding body 100 along the one direction (second direction Y) described above of the holding body 100. Further, the light source 200 applies light toward at least a part of the space S located on the side (negative direction of the first direction X) of the holding body 100 with respect to the one direction (second direction Y) described above of the holding body 100, the front (negative direction of the third direction Z) of the space S, and the back (positive direction of the third direction Z) of the space S. The optical sensor 300 is attached to the holding body 100. Further, at least a part of a visual field of the optical sensor 300 faces at least a part of the space S, the front (negative direction of the third direction Z) of the space S, and the back (positive direction of the third direction Z) of the space S.

According to the present example embodiment, light of the light source 200 can be applied to an object located in the space S located on the side (negative direction of the first direction X) of the holding body 100, the front (negative direction of the third direction Z) of the space S, or the back (positive direction of the third direction Z) of the space S. Further, an object to which light of the light source 200 is applied can be detected by the optical sensor 300. Therefore, an object that is present in a specific region (the space S, the front (negative direction of the third direction Z) of the space S, or the back (positive direction of the third direction Z) of the space S), or passes through a specific region (the space S, the front (negative direction of the third direction Z) of the space S, or the back (positive direction of the third direction Z) of the space S) can be recognized with high sensitivity.

Details of the object recognition device 10 will be described by using FIG. 1.

The holding body 100 holds the light source 200 and the optical sensor 300. The holding body 100 is an extending body extending in one direction (second direction Y). The holding body 100 may be able to expand and contract in the one direction (second direction Y) described above. In this case, a length of the holding body 100 can be adjusted to an appropriate length for a member to which the holding body 100 is attached. For example, the holding body 100 may include a cylindrical member, and an extending member inserted movably with respect to the cylindrical member. In this example, a length of the holding body 100 in the one direction (second direction Y) described above can be adjusted by moving the extending member with respect to the cylindrical member. However, a structure for adjusting a length of the holding body 100 in the one direction (second direction Y) described above is not limited to this example. Further, the holding body 100 may not be able to expand and contract in the one direction (second direction Y) described above.

The light source 200 is located on a surface side (surface side on a negative direction side of the first direction X) of the holding body 100 facing the space S. Light applied from the light source 200 is, for example, visible light, an infrared ray, or an ultraviolet ray. The "light source 200 being attached to the holding body 100 along one direction (second direction Y)" means that, for example, the light source 200 is a linear light source (for example, a stick-shaped fluorescent lamp) continuously extending along the one direction (second direction Y) described above of the holding body 100. Alternatively, the "light source 200 being attached to the holding body 100 along one direction (second direction Y)" means that, for example, a plurality of the light sources 200 (for example, a plurality of dot-shaped light sources 200 or a plurality of segment-shaped light sources 200) are aligned away from each other along the one direction (second direction Y) described above of the holding body 100. The light source 200 may be provided on the holding body 100 across substantially a whole (for example, equal to or more than 90% and equal to or less than 100% of a total length of the holding body 100 in the one direction (second direction Y) described above except for a region where the optical sensor 300 is attached) in the one direction (second direction Y) described above of the holding body 100 except for the region where the optical sensor 300 is attached. Alternatively, the light source 200 may be provided only on a part (for example, equal to or more than ⅓ of the total length of the holding body 100 in the one direction (second direction Y) described above) of the holding body 100 in the one direction (second direction Y) described above.

The optical sensor 300 is a capturing unit of a camera and the like, for example. The object recognition device 10 includes a cover 302 that covers a sensor main body (for example, a lens of a camera). If the cover 302 is not provided, the sensor main body is exposed. In this case, there is a possibility that a person approaching the object recognition device 10 may have a feeling of anxiety about being monitored by the optical sensor 300 (sensor main body). In contrast, when the cover 302 is provided, a person approaching the object recognition device 10 can be prevented from having such a feeling of anxiety. However, the object recognition device 10 may not include the cover 302.

The optical sensor 300 is located on the surface side (surface side on the negative direction side of the first direction X) of the holding body 100 facing the space S. The optical sensor 300 is located in such a way as to be shifted from the light source 200 along the one direction (second direction Y) described above of the holding body 100. Specifically, the optical sensor 300 is attached to one end (upper end: end on a positive direction side of the second direction Y) of the holding body 100. However, the optical sensor 300 may be attached to a position (for example, the center of the holding body 100 in the one direction (second direction Y) described above of the holding body 100) shifted from the one end (upper end: end on the positive direction side of the second direction Y) of the holding body 100 in the one direction (second direction Y) described above of the holding body 100.

The visual field of the optical sensor 300 (for example, a central line of the visual field of the optical sensor 300) faces, from a position in which the optical sensor 300 is located toward the space S, the front (negative direction of the third direction Z) of the space S, or the back (positive direction of the third direction Z) of the space S, in a direction (for example, a direction from the position in which the optical sensor 300 is located toward between the negative direction of the first direction X and the negative direction of the second direction Y) obliquely intersecting the one direction (second direction Y) described above of the holding body 100. As viewed from the front (negative direction of the third direction Z) or the back (positive direction of the third direction Z) of the space S, the visual field of the optical sensor 300 expands further with a longer distance from the position in which the optical sensor 300 is located. Therefore, if the visual field of the optical sensor 300 (for example, the central line of the visual field of the optical sensor 300) faces, from the position in which the optical sensor 300 is located toward the space S, the front (negative direction of the third direction Z) of the space S, or the back (positive direction of the third direction Z) of the space S, in a direction (for example, a direction from the position in which the optical sensor 300 is located toward the negative direction of the first direction X) being orthogonal to the one direction (second direction Y) described above of the holding body 100, a region of the space S adjacent to the optical sensor 300 in the one direction (second direction Y) described above of the holding body 100 may be a blind spot of the visual field of the optical sensor 300. In contrast, in the present example embodiment, a region of the space S (for example, a region of the space S located below (negative direction of the second direction Y) the optical sensor 300) adjacent to the optical sensor 300 in the one direction (second direction Y) described above of the holding body 100 can be included in the visual field of the optical sensor 300. However, the visual field of the optical sensor 300 (for example, the central line of the visual field of the optical sensor 300) may face, from the position in which the optical sensor 300 is located toward the space S, the front (negative direction of the third direction Z) of the space S, or the back (positive direction of the third direction Z) of the space S, in the direction (for example, the negative direction of the first direction X) being orthogonal to the one direction (second direction Y) described above of the holding body 100.

As described above, in the present example embodiment, the optical sensor 300 is attached to the one end (upper end: end on the positive direction side of the second direction Y) of the holding body 100. Therefore, as viewed from the front (negative direction of the third direction Z) or the back (positive direction of the third direction Z) of the space S, when the central line of the visual field of the optical sensor 300 extends from the position in which the optical sensor 300 is located toward obliquely below (direction toward between the negative direction of the first direction X and the negative direction of the second direction Y), the entire visual field of the optical sensor 300 can include almost an entire area of the space S as viewed from the front (negative direction of the third direction Z) or the back (positive direction of the third direction Z) of the space S.

The visual field of the optical sensor 300 may expand in the front-back direction (third direction Z) of the space S from the optical sensor 300 toward the space S (from the positive direction of the first direction X toward the negative direction of the first direction X). When the central line of the visual field of the optical sensor 300 extends toward the space S in this case, an end of the visual field of the optical sensor 300 on a front side (negative direction side of the third direction Z) of the space S may reach the front (negative direction of the third direction Z) of the space S, and an end of the visual field of the optical sensor 300 on a back side (positive direction side of the third direction Z) of the space S may reach the back (positive direction of the third direction Z) of the space S. Further, when the central line of the visual field of the optical sensor 300 extends toward the front (negative direction of the third direction Z) of the space S, the end of the visual field of the optical sensor 300 on the back side (positive direction side of the third direction Z) of the space S may reach the space S or may reach the back (positive direction of the third direction Z) of the space S. Furthermore, when the central line of the visual field of the optical sensor 300 extends toward the back (positive direction of the third direction Z) of the space S, the end of the visual field of the optical sensor 300 on the front side (negative direction side of the third direction Z) of the space S may reach the space S or may reach the front (negative direction of the third direction Z) of the space S.

The optical sensor 300 may be attached to the holding body 100 in such a way as to be movable in the one direction (second direction Y) described above of the holding body 100. In this case, a position of the optical sensor 300 can be appropriately adjusted according to a use situation of the object recognition device 10. For example, the optical sensor 300 may be slidable along a rail provided on a predetermined surface (for example, a surface on which the light source 200 is provided, or a surface different from the surface on which the light source 200 is provided) of the holding body 100. Note that, the optical sensor 300 may be fixed to the holding body 100 in such a way as not to be movable.

In the present example embodiment, the optical sensor 300 is attached to only one end (upper end: end on the positive direction side of the second direction Y) of the holding body 100 among the one end (upper end: end on the positive direction side of the second direction Y) and another end (lower end: end on a negative direction side of the second direction Y) of the holding body 100. However, the optical sensor 300 may be attached to both of the one end (upper end: end on the positive direction side of the second direction Y) and the another end (lower end: end on the negative direction side of the second direction Y) of the holding body 100. In this case, a region where the object recognition device 10 can recognize an object can be complemented by a visual field of the optical sensor 300 attached to the one end (upper end: end on the positive direction side of the second direction Y) of the holding body 100 and a visual field of the optical sensor 300 attached to the another end (lower end: end on the negative direction side of the second direction Y) of the holding body 100 to each other. Note that, the optical sensor 300 attached in addition to the optical sensor 300 attached to the one end (upper end: end on the positive direction side of the second direction Y) of the holding body 100 may be attached to a position shifted from the another end (lower end: end on the negative direction side of the second direction Y) of the holding body 100 in the one direction (second direction Y) described above of the holding body 100. Further, the number of the optical sensor 300 attached to the holding body 100 may not be one or two, and may be three or more. In other words, at least one optical sensor 300 can be attached to the holding body 100.

Second Example Embodiment

Figure 2:
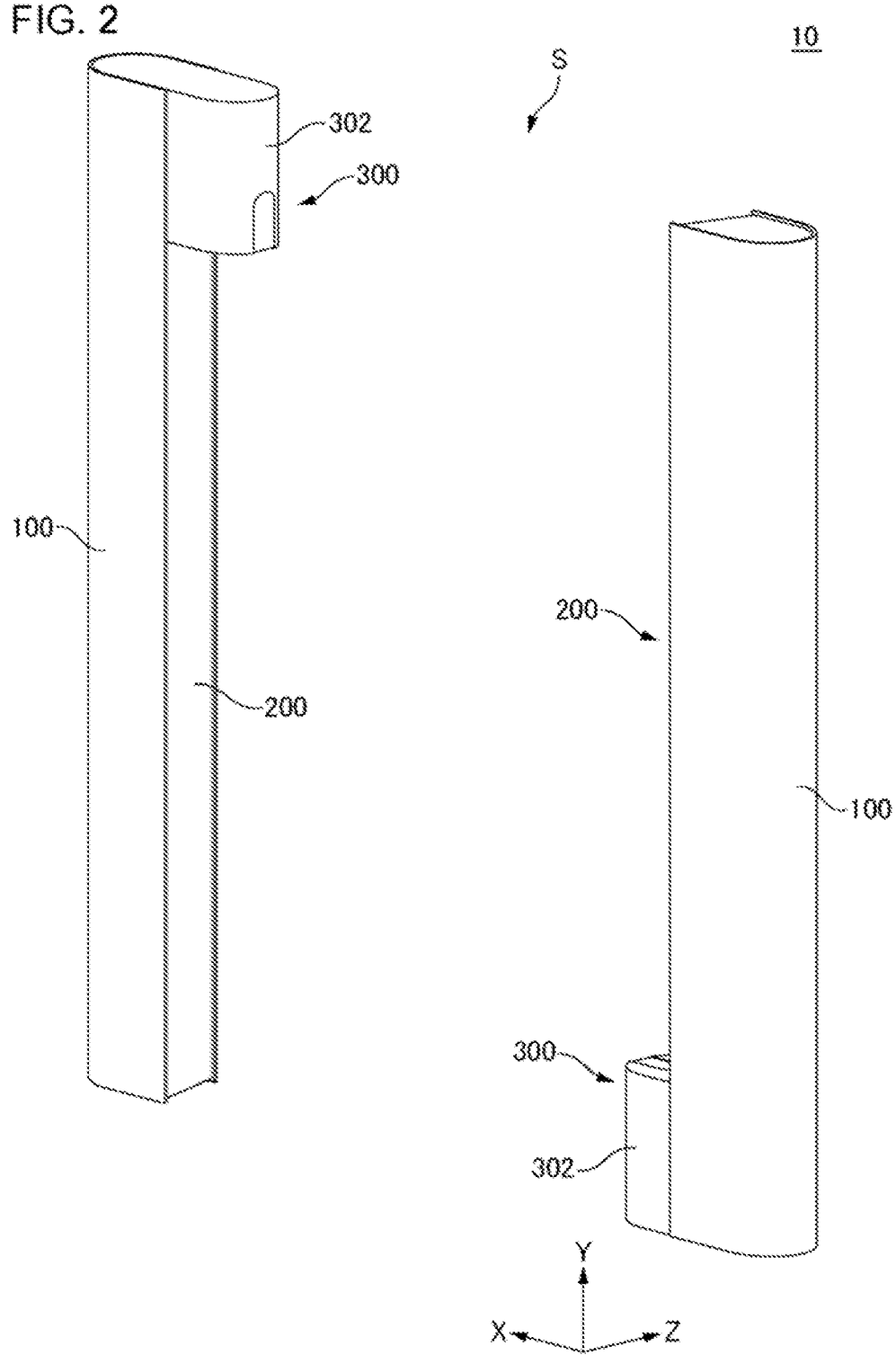
FIG. 2 is a perspective view of an object recognition device according to a second example embodiment.

FIG. 2 is a perspective view of an object recognition device 10 according to a second example embodiment. The object recognition device 10 according to the second example embodiment is similar to the object recognition device 10 according to the first example embodiment except for the following points.

An outline of the object recognition device 10 will be described by using FIG. 2.

The object recognition device 10 includes a pair of holding bodies 100. The pair of holding bodies 100 face each other substantially in parallel across a space S. "Substantially in parallel" means not only that the pair of holding bodies 100 are disposed strictly in parallel, but also means that one of the pair of holding bodies 100 is tilted by a slight angle (for example, equal to or less than 2.5 degrees) with respect to another of the pair of holding bodies 100 (for example, in FIG. 2, one of the pair of holding bodies 100 is parallel to the second direction Y, and another of the pair of holding bodies 100 is tilted by a slight angle from the second direction Y toward a direction (for example, the first direction X or the third direction Z) perpendicular to the second direction Y). However, the pair of holding bodies 100 may not face each other substantially in parallel, and may face each other while being obliquely tilted to each other. Further, for example, the pair of holding bodies 100 may be tilted from the vertical direction (second direction Y) toward the horizontal direction (for example, the first direction X or the third direction Z), or may be substantially parallel to the horizontal direction (for example, the first direction X or the third direction Z).

In the present example embodiment, a lower end (end on the negative direction side of the second direction Y) of each of the pair of holding bodies 100 is aligned in an up-down direction (second direction Y) of the space S, and an upper end (end on the positive direction side of the second direction Y) of each of the pair of holding bodies 100 is aligned in the up-down direction (second direction Y) of the space S. However, the lower end (end on the negative direction side of the second direction Y) of each of the pair of holding bodies 100 may be shifted in the up-down direction (second direction Y) of the space S, and the upper end (end on the positive direction side of the second direction Y) of each of the pair of holding bodies 100 may be shifted in the up-down direction (second direction Y) of the space S.

In the present example embodiment, a light source 200 and an optical sensor 300 are attached to each of the pair of holding bodies 100. However, the light source 200 may be attached to only one (for example, the holding body 100 on the positive direction side of the first direction X) of the pair of holding bodies 100, for example, and the optical sensor 300 may be attached to only another (for example, the holding body 100 on the negative direction side of the first direction X) of the pair of holding bodies 100, for example. In other words, the light source 200 can be attached to at least one of the pair of holding bodies 100, and the optical sensor 300 can be attached to at least another of the pair of holding bodies 100.

In the present example embodiment, an element including one (the holding body 100 on the positive direction side of the first direction X) of the pair of holding bodies 100, and the light source 200 and the optical sensor 300 that are attached to the one holding body 100, and an element including another (the holding body 100 on the negative direction side of the first direction X) of the pair of holding bodies 100, and the light source 200 and the optical sensor 300 that are attached to the another holding body 100 have the same configuration (for example, a shape of the holding body 100, a wavelength of light of the light source 200, and a wavelength detected by the optical sensor 300), and the elements are disposed in such a way to have rotational symmetry with respect to the center of the space S as viewed from the front (negative direction of the third direction Z) or the back (positive direction of the third direction Z) of the space S. In this case, a configuration does not need to be changed between one and another of the two elements, and the object recognition device 10 can be formed by appropriately disposing the two elements. Thus, as compared to a case where the two elements have configurations different from each other, formation of the object recognition device 10 can be facilitated. However, the two elements may include configurations different from each other.

The number of the holding body 100 of the object recognition device 10 is not limited to the number (two) according to the present example embodiment. The object recognition device 10 may include three or more holding bodies 100. In other words, the object recognition device 10 can include the plurality of holding bodies 100.

Details of the object recognition device 10 will be described by using FIG. 2.

The light source 200 attached to the one (the holding body 100 on the positive direction side of the first direction X) of the pair of holding bodies 100 and the light source 200 attached to the another (the holding body 100 on the negative direction side of the first direction X) of the pair of holding bodies 100 face each other across the space S.

The optical sensor 300 attached to the one (the holding body 100 on the positive direction side of the first direction X) of the pair of holding bodies 100 is attached to the upper end (end on the positive direction side of the second direction Y) of the one holding body 100. In contrast, the optical sensor 300 attached to the another (the holding body 100 on the negative direction side of the first direction X) of the pair of holding bodies 100 is attached to the lower end (end of the negative direction side of the second direction Y) of the another holding body 100. Note that, the optical sensor 300 attached to the one (the holding body 100 on the positive direction side of the first direction X) of the pair of holding bodies 100 may be attached to a position shifted from the upper end (end on the positive direction side of the second direction Y) of the one holding body 100 in the one direction (second direction Y) described above of the one holding body 100. Further, the optical sensor 300 attached to the another (the holding body 100 on the negative direction side of the first direction X) of the pair of holding bodies 100 may be attached to a position shifted from the lower end (end on the negative direction side of the second direction Y) of the another holding body 100 in the one direction (second direction Y) described above of the another holding body 100.

The optical sensor 300 attached to the one (the holding body 100 on the positive direction side of the first direction X) of the pair of holding bodies 100 and the optical sensor 300 attached to the another (the holding body 100 on the negative direction side of the first direction X) of the pair of holding bodies 100 face each other in a direction obliquely intersecting the one direction (second direction Y) described above of the one (the holding body 100 on the positive direction side of the first direction X) or the another (the holding body 100 on the negative direction side of the first direction X) of the pair of holding bodies 100. In this case, a region where the object recognition device 10 can recognize an object can be complemented by a visual field of the optical sensor 300 attached to the one (the holding body 100 on the positive direction side of the first direction X) of the pair of holding bodies 100 and a visual field of the optical sensor 300 attached to the another (the holding body 100 on the negative direction side of the first direction X) of the pair of holding bodies 100 to each other.

The visual field of the optical sensor 300 attached to the one (the holding body 100 on the positive direction side of the first direction X) of the pair of holding bodies 100 and the visual field of the optical sensor 300 attached to the another (the holding body 100 on the negative direction side of the first direction X) of the pair of holding bodies 100 may face the same region among the space S, the front (negative direction of the third direction Z) of the space S, and the back (positive direction of the third direction Z) of the space S. For example, when the visual field of the optical sensor 300 attached to the one (the holding body 100 on the positive direction side of the first direction X) of the pair of holding bodies 100 faces the space S, the visual field of the optical sensor 300 attached to the another (the holding body 100 on the negative direction side of the first direction X) of the pair of holding bodies 100 also faces the space S. In this case, in a region that the visual fields of the two optical sensors 300 face, a dead spot of the visual fields of the two optical sensors 300 can be more reliably reduced than that when a visual field of only one optical sensor 300 faces the region.

The visual field of the optical sensor 300 attached to the one (the holding body 100 on the positive direction side of the first direction X) of the pair of holding bodies 100 and the visual field of the optical sensor 300 attached to the another (the holding body 100 on the negative direction side of the first direction X) of the pair of holding bodies 100 may face different regions among the space S, the front (negative direction of the third direction Z) of the space S, and the back (positive direction of the third direction Z) of the space S. For example, when the visual field of the optical sensor 300 attached to the one (the holding body 100 on the positive direction side of the first direction X) of the pair of holding bodies 100 faces the front (negative direction of the third direction Z) of the space S, the visual field of the optical sensor 300 attached to the another (the holding body 100 on the negative direction side of the first direction X) of the pair of holding bodies 100 faces the back (positive direction of the third direction Z) of the space S. In this case, a region where the object recognition device 10 can recognize an object can be expanded from the front (negative direction of the third direction Z) toward the back (positive direction of the third direction Z). In this case, a part of the visual field of the optical sensor 300 attached to the one (the holding body 100 on the positive direction side of the first direction X) of the pair of holding bodies 100 may intersect or may not intersect a part of the visual field of the optical sensor 300 attached to the another (the holding body 100 on the negative direction side of the first direction X) of the pair of holding bodies 100.

An arrangement of the optical sensor 300 attached to each of the pair of holding bodies 100 is not limited to the arrangement according to the present example embodiment. For example, the optical sensor 300 attached to the one (the holding body 100 on the positive direction side of the first direction X) of the pair of holding bodies 100 and the optical sensor 300 attached to the another (the holding body 100 on the negative direction side of the first direction X) of the pair of holding bodies 100 may face each other in a direction (for example, the first direction X) orthogonal to the one direction (second direction Y) described above of the one (the holding body 100 on the positive direction side of the first direction X) or the another (the holding body 100 on the negative direction side of the first direction X) of the pair of holding bodies 100.

Next, a relationship between a wavelength of light applied from the light source 200 and a wavelength of light detected by the optical sensor 300 will be described. A wavelength of light applied from the light source 200 and a wavelength of light detected by the optical sensor 300 are selected as appropriate according to a use of the object recognition device 10. For example, the wavelengths are as follows.

In one example, light applied from the light source 200 is white light, and light detected by the optical sensor 300 is red, green, blue (RGB) light. For example, the light source 200 includes white lighting, and the optical sensor 300 includes an RGB camera. In this example, the object recognition device 10 can recognize an object such as a person and an article from a color image acquired by the optical sensor 300.

In another example, light applied from the light source 200 is infrared light, and light detected by the optical sensor 300 is infrared light. For example, the light source 200 includes infrared lighting, and the optical sensor 300 includes an infrared camera. In this example, intensity of light (infrared light) applied from the light source 200 can be increased without giving glare to a person located near the object recognition device 10.

In still another example, light applied from the light source 200 is both of white light and infrared light, and light detected by the optical sensor 300 is both of RGB light and infrared light. For example, the light source 200 includes both of white lighting and infrared lighting, and the optical sensor 300 includes both of an RGB camera and an infrared camera. In this example, a movement of an object such as a person and an article can be recognized by the infrared camera, and a kind of an object such as a person and an article can be recognized by the RGB camera.

The light source 200 continuously applies light (for example, at least one of white light and infrared light). Alternatively, the light source 200 may intermittently apply light (for example, at least one of white light and infrared light). When the light source 200 intermittently applies light, the light source 200 may include, for example, stroboscopic lighting. In this case, as compared to a case where light is continuously applied, motion blur of an object such as a person and an article can be suppressed.

Figure 3:
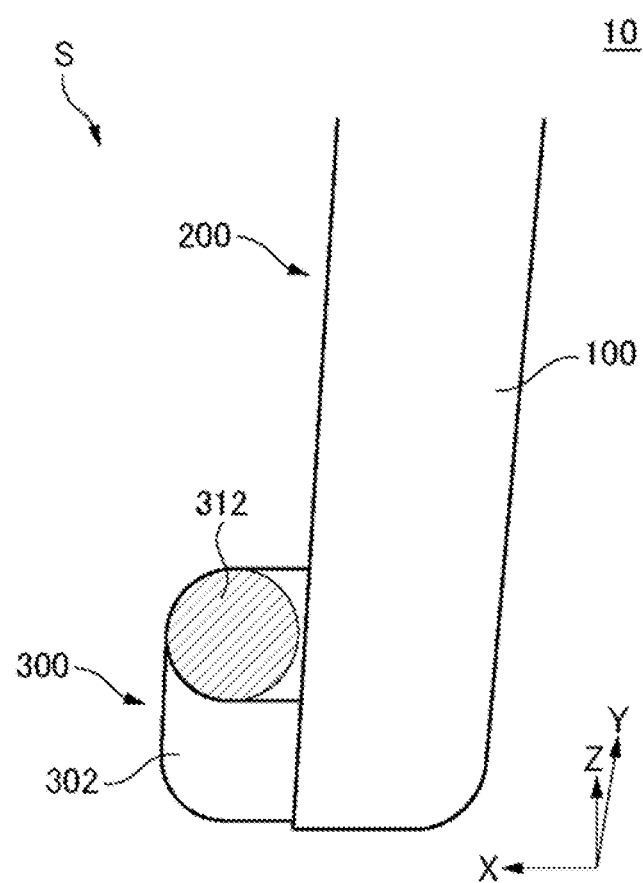
FIG. 3 is a diagram for describing a first example of an optical sensor having a visual field facing upward from downward in FIG. 2.

FIG. 3 is a diagram for describing a first example of the optical sensor 300 (the optical sensor 300 on the negative direction side of the first direction X in FIG. 2) having a visual field facing upward (positive direction of the second direction Y) from downward (negative direction of the second direction Y) in the vertical direction (second direction Y) in FIG. 2.

The optical sensor 300 (the optical sensor 300 on the negative direction side of the first direction X in FIG. 2) having the visual field facing upward (positive direction of the second direction Y) from downward (negative direction of the second direction Y) in the vertical direction (second direction Y) may be covered by a half mirror 312. In this case, a person (on a bright side with respect to a side on which the optical sensor 300 is located) approaching the object recognition device 10 is clearly seen via the half mirror 312 from the optical sensor 300 side (on a dark side with respect to a side on which the person approaching the object recognition device 10 is located), whereas the optical sensor 300 (on the dark side with respect to the side on which the person approaching the object recognition device 10 is located) is hardly seen by the half mirror 312 from the side (on the bright side with respect to the side on which the optical sensor 300 is located) of the person approaching the object recognition device 10. Therefore, the person approaching the object recognition device 10 can be prevented from having a feeling of anxiety about being monitored from downward (negative direction of the second direction Y) by the optical sensor 300.

The optical sensor 300 (the optical sensor 300 on the positive direction side of the first direction X in FIG. 2) having the visual field facing downward (negative direction of the second direction Y) from upward (positive direction of the second direction Y) in the vertical direction (second direction Y) in FIG. 2 may not be covered or may be covered by a half mirror. For example, the optical sensor 300 (the optical sensor 300 on the negative direction side of the first direction X in FIG. 2) having the visual field facing upward (positive direction of the second direction Y) from downward (negative direction of the second direction Y) in the vertical direction (second direction Y) may be covered by the half mirror 312, whereas the optical sensor 300 (the optical sensor 300 on the positive direction side of the first direction X in FIG. 2) having the visual field facing downward (negative direction of the second direction Y) from upward (positive direction of the second direction Y) in the vertical direction (second direction Y) may not be covered by a half mirror. In this case, the amount of light detected by the optical sensor 300 (the optical sensor 300 on the positive direction side of the first direction X in FIG. 2) having the visual field facing downward (negative direction of the second direction Y) from upward (positive direction of the second direction Y) in the vertical direction (second direction Y) can be increased further than that when a half mirror is provided.

Figure 4:
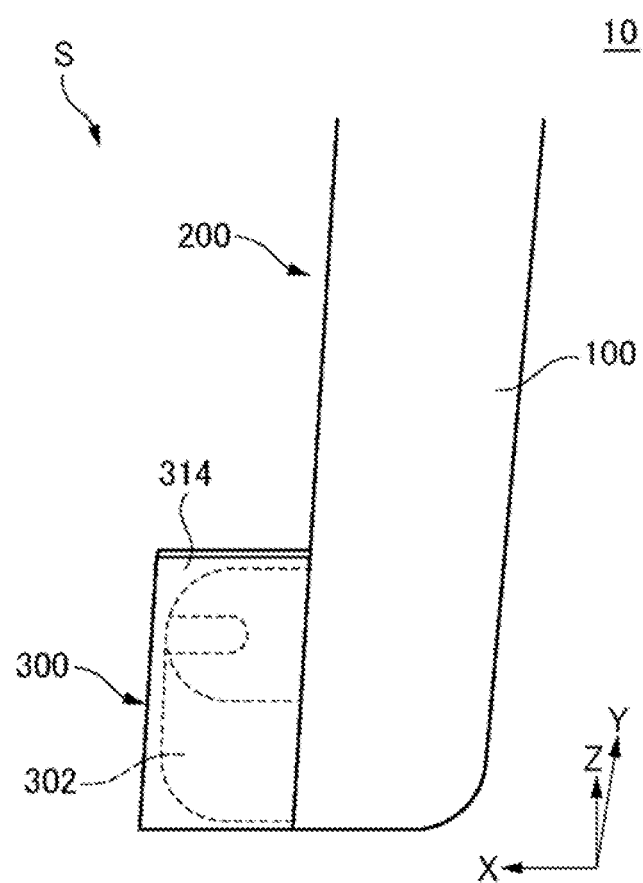
FIG. 4 is a diagram for describing a second example of the optical sensor having the visual field facing upward from downward in FIG. 2.

FIG. 4 is a diagram for describing a second example of the optical sensor 300 (the optical sensor 300 on the negative direction side of the first direction X in FIG. 2) having the visual field facing upward (positive direction of the second direction Y) from downward (negative direction of the second direction Y) in the vertical direction (second direction Y) in FIG. 2.

A front portion (portion on the negative direction side of the third direction Z) of the optical sensor 300 (cover 302) (the optical sensor 300 (cover 302) on the negative direction side of the first direction X in FIG. 2) having the visual field facing upward (positive direction of the second direction Y) from downward (negative direction of the second direction Y) in the vertical direction (second direction Y) may be covered by a shielding body 314. When the shielding body 314 is provided, the optical sensor 300 (cover 302) is hidden by the shielding body 314 from a person located at the front (negative direction of the third direction Z) of the space S. Thus, the person located at the front (negative direction of the third direction Z) of the space S can be prevented from having a feeling of anxiety about being monitored from downward (negative direction of the second direction Y) by the optical sensor 300. Further, when the shielding body 314 is provided, an object such as a person located at the front (negative direction of the third direction Z) of the space S can be prevented from being detected by the optical sensor 300. Thus, privacy of the person located at the front (negative direction of the third direction Z) of the space S can be protected.

A front portion (portion on the negative direction side of the third direction Z) of the optical sensor 300 (cover 302) (the optical sensor 300 (cover 302) on the positive direction side of the first direction X in FIG. 2) having the visual field facing downward (negative direction of the second direction Y) from upward (positive direction of the second direction Y) in the vertical direction (second direction Y) may be covered or may not be covered by a shielding body.

Figure 5:
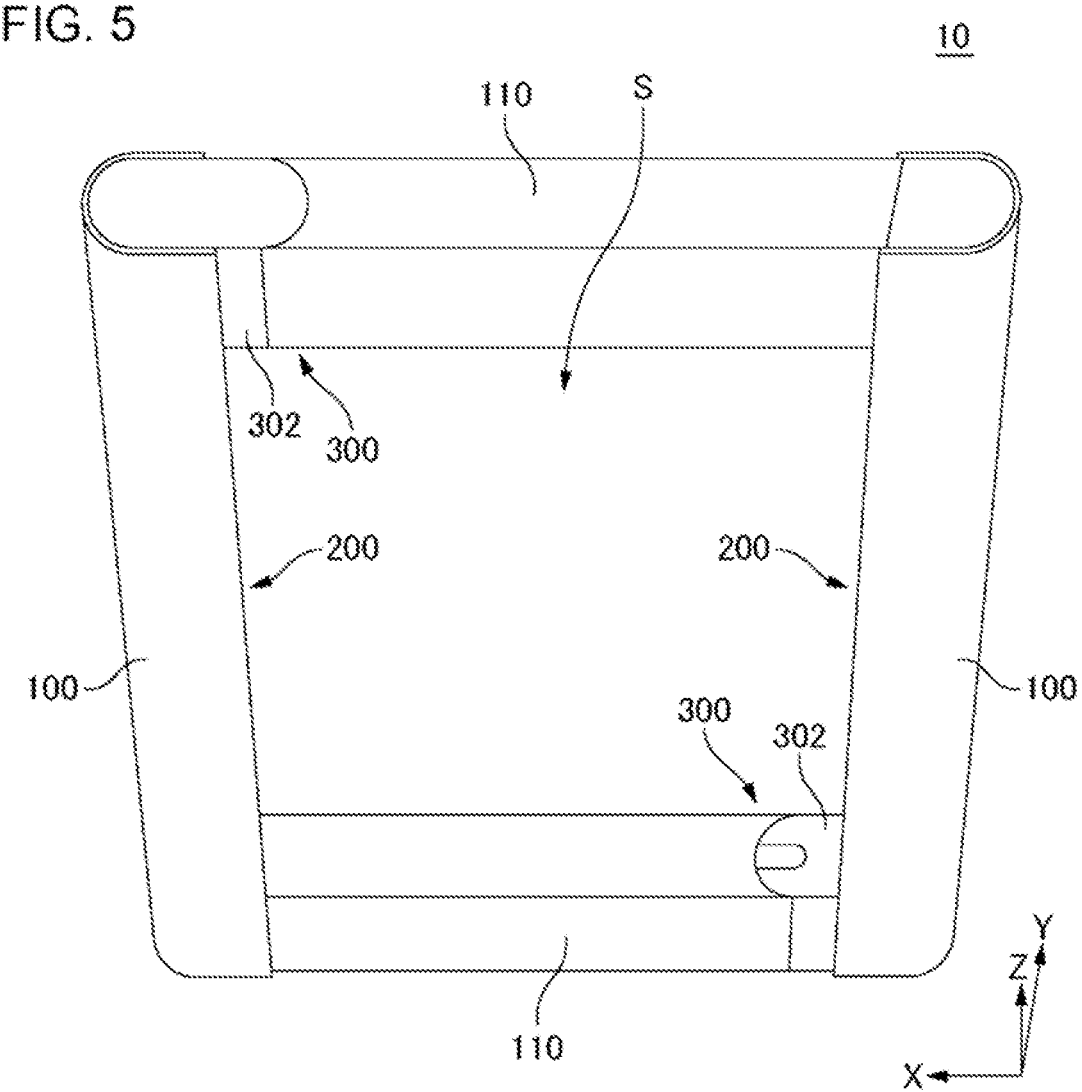
FIG. 5 is a diagram illustrating a first modification example of FIG. 2.

FIG. 5 is a diagram illustrating a first modification example of FIG. 2.

The object recognition device 10 further includes two spacers 110. Each of the spacers 110 is connected to each of the pair of holding bodies 100. One (the spacer 110 on the positive direction side of the second direction Y) of the two spacers 110 is connected to an upper end side (positive direction side of the second direction Y) of each of the pair of holding bodies 100. In contrast, another (the spacer 110 on the negative direction side of the second direction Y) of the two spacers 110 is connected to a lower end side (negative direction side of the second direction Y) of each of the pair of holding bodies 100. Note that, the object recognition device 10 may include only one spacer 110, or may include three or more spacers 110. In other words, the object recognition device 10 can include at least one or the plurality of spacers 110.

In the present modification example, a gap between the pair of holding bodies 100 can be adjusted to an appropriate length by a length of each of the spacers 110. For example, each of the spacers 110 can expand and contract along a left-right direction (first direction X) of the space S between the pair of holding bodies 100. In this case, each of the spacers 110 may include a cylindrical member, and an extending member inserted movably with respect to the cylindrical member. In this example, a length of each of the spacers 110 in an extending direction (first direction X) can be adjusted by moving the extending member with respect to the cylindrical member. However, a structure for adjusting a length of each of the spacers 110 in the extending direction (first direction X) is not limited to this example. Further, each of the spacers 110 may not be able to expand and contract between the pair of holding bodies 100. Even in this case, by preparing the plurality of spacers 110 having different lengths, and selecting the spacer 110 having an appropriate length from the plurality of spacers 110, a gap between the pair of holding bodies 100 can be adjusted to an appropriate length.

Each of the spacers 110 may be transparent. In this case, an object present at the back (positive direction of the third direction Z) of each of the spacers 110 as viewed from the front (negative direction of the third direction Z) of the space S can be seen even through each of the spacers 110. However, each of the spacers 110 may not be transparent.

Figure 6:
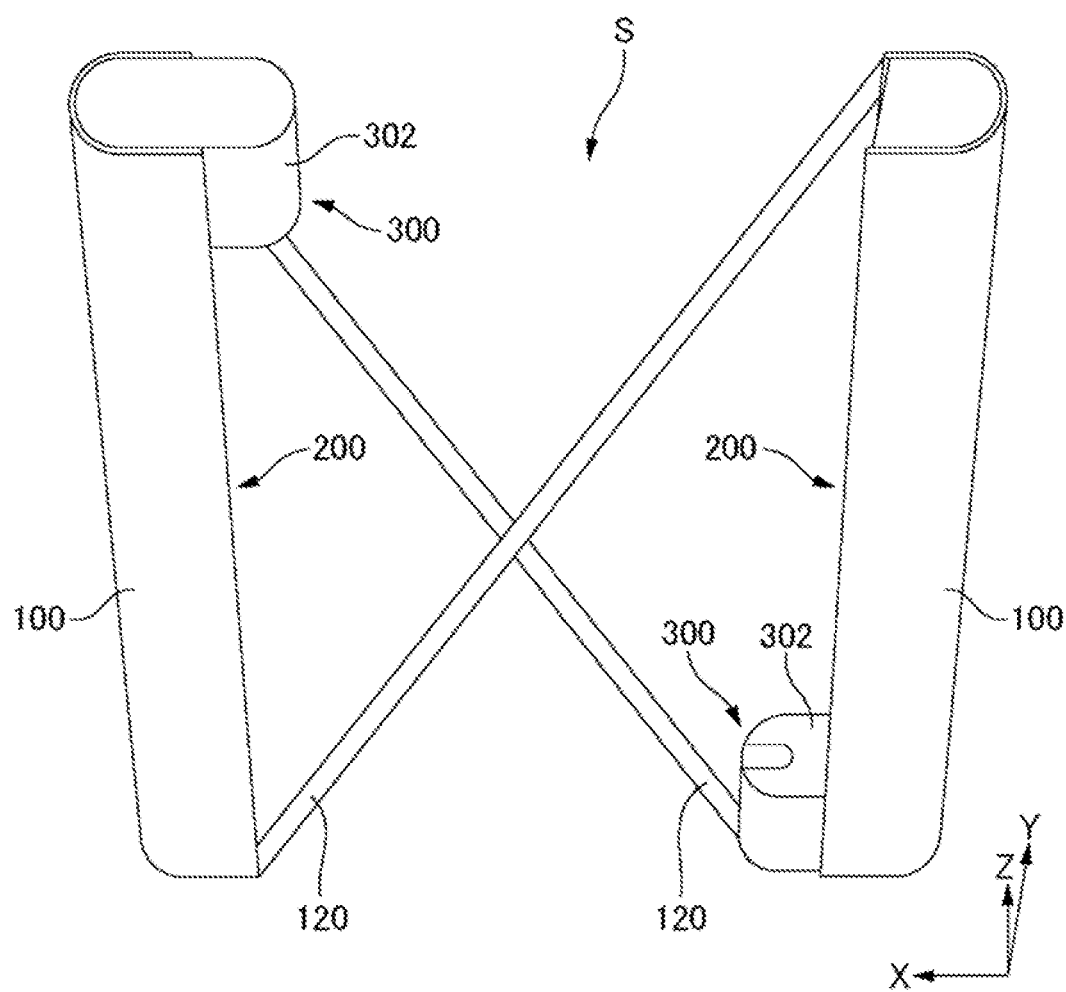
FIG. 6 is a diagram illustrating a second modification example of FIG. 2.

FIG. 6 is a diagram illustrating a second modification example of FIG. 2.

The object recognition device 10 includes a pair of guide members 120 that can expand and contract. Each of the guide members 120 is, for example, a tape measure or a folding measure. FIG. 6 illustrates each of the guide members 120 expanding. Each of the guide members 120 contracting (for example, a tape measure being wounded or a folding measure being folded) is provided in advance in a predetermined position (for example, near the optical sensor 300) of each of the holding bodies 100. Each of the guide members 120 contracting is expanded, and each of the expanded guide members 120 is attached to the holding body 100 (for example, an engagement member, such as a hook, being provided in advance on an end portion of the holding body 100 located on a side opposite to an end portion on which the optical sensor 300 is provided) on the other side. In this way, as illustrated in FIG. 6, the pair of guide members 120 intersect each other between the pair of holding bodies 100. Specifically, one end and another end of one (the guide member 120 extending in a direction between the positive direction of the first direction X and the positive direction of the second direction Y) of the pair of guide members 120 are each fixed to an upper end (end on the positive direction side of the second direction Y) of one (the holding body 100 on the positive direction side of the first direction X) of the pair of holding bodies 100 and a lower end (end on the negative direction side of the second direction Y) of another (the holding body 100 on the negative direction side of the first direction X) of the pair of holding bodies 100. Further, one end and another end of another (the guide member 120 extending in a direction between the negative direction of the first direction X and the positive direction of the second direction Y) of the pair of guide members 120 are each fixed to a lower end (end on the negative direction side of the second direction Y) of the one (the holding body 100 on the positive direction side of the first direction X) of the pair of holding bodies 100 and an upper end (end on the positive direction side of the second direction Y) of the another (the holding body 100 on the negative direction side of the first direction X) of the pair of holding bodies 100.

As illustrated in FIG. 6, when the pair of guide members 120 intersect each other between the pair of holding bodies 100, and the optical sensor 300 attached to each of the pair of holding bodies 100 is disposed in an appropriate position (for example, a straight line connecting the optical sensors 300 pass through the center of the space S as viewed from the front (negative direction of the third direction Z) or the back (positive direction of the third direction Z) of the space S), the pair of guide members 120 are provided in such a way as to intersect each other at a predetermined portion (for example, the center) of each of the one and the another of the pair of guide members 120. A mark may be provided in advance to the predetermined portion (for example, the center) of each of the guide members 120. In this case, alignment of the pair of holding bodies 100 (the optical sensor 300 attached to each of the pair of holding bodies 100) can be appropriately performed by using the pair of guide members 120.

Figure 7:
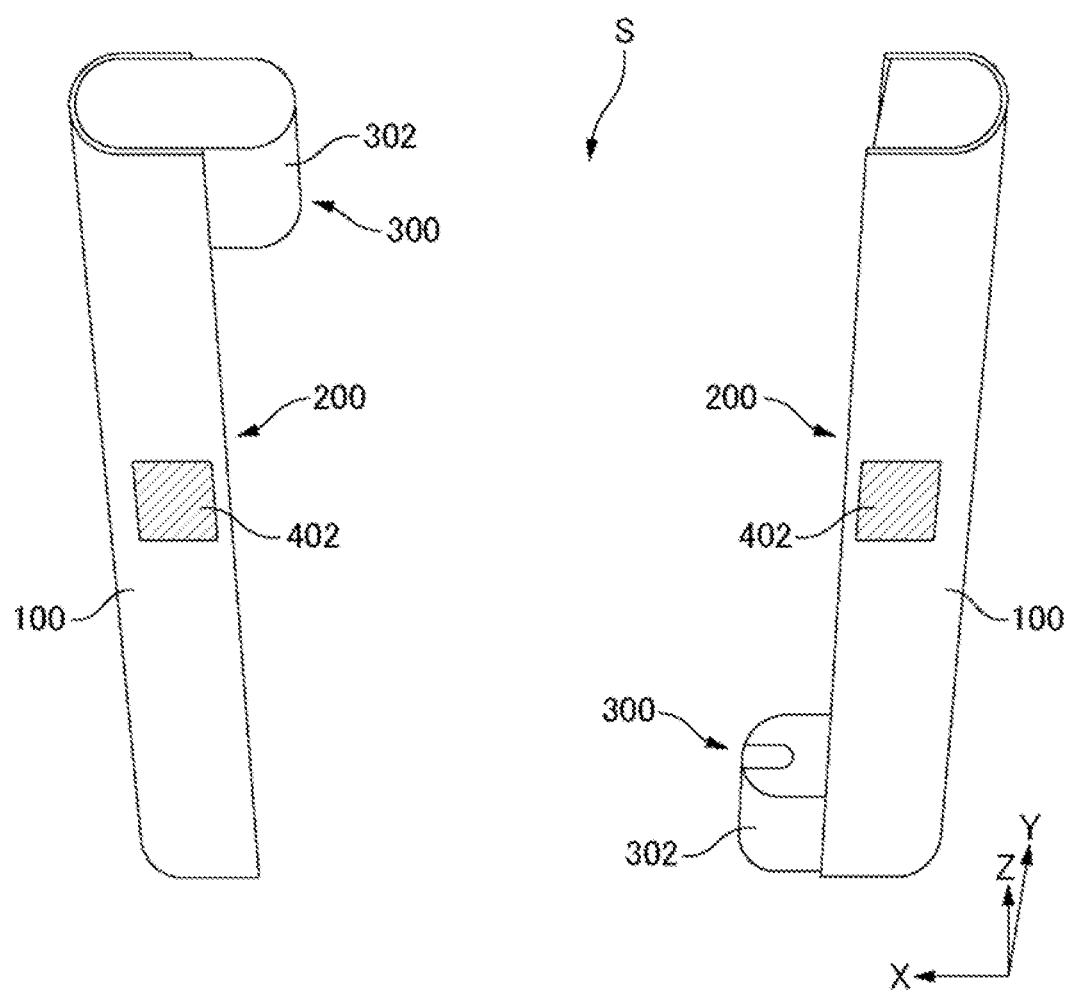
FIG. 7 is a diagram illustrating a third modification example of FIG. 2.

FIG. 7 is a diagram illustrating a third modification example of FIG. 2.

The object recognition device 10 further includes a human detection sensor 402. The human detection sensor 402 detects a person located at the front (negative direction of the third direction Z) of the object recognition device 10. The human detection sensor 402 is various sensors that can detect a person, for example, an optical sensor such as an infrared sensor and a visible light sensor, and a sound sensor (for example, a microphone) such as an ultrasonic sensor and an audible sound wave sensor. The human detection sensor 402 is provided on a front surface side (surface side on the negative direction side of the third direction Z) of each of the holding bodies 100. In this case, as compared to a case where the human detection sensor 402 is provided in a position different from the front surface of each of the holding bodies 100, the human detection sensor 402 can more easily detect a person located at the front (negative direction of the third direction Z) of the object recognition device 10. However, as long as the human detection sensor 402 can detect a person located at the front (negative direction of the third direction Z) of the object recognition device 10, the human detection sensor 402 may be provided in a position different from the front surface side (surface side on the negative direction side of the third direction Z) of each of the holding bodies 100.

An operation state of at least one of the light source 200 and the optical sensor 300 that are attached to each of the holding bodies 100 can be switched according to a detection result of the human detection sensor 402. For example, the amount of light applied from the light source 200 may be set higher when the human detection sensor 402 detects a person located at the front (negative direction of the third direction Z) of the object recognition device 10 than that when the human detection sensor 402 does not detect a person located at the front (negative direction of the third direction Z) of the object recognition device 10. For example, the light source 200 may apply light when the human detection sensor 402 detects a person located at the front (negative direction of the third direction Z) of the object recognition device 10, whereas the light source 200 may not apply light when the human detection sensor 402 does not detect a person located at the front (negative direction of the third direction Z) of the object recognition device 10. Further, the optical sensor 300 may be stopped when the human detection sensor 402 does not detect a person located at the front (negative direction of the third direction Z) of the object recognition device 10, and the optical sensor 300 may be activated when the human detection sensor 402 detects a person located at the front (negative direction of the third direction Z) of the object recognition device 10. In this case, the light source 200 and the optical sensor 300 do not need to be always operated. Therefore, as compared to a case where the light source 200 and the optical sensor 300 are always operated, consumed power of the object recognition device 10 can be reduced.

In the present modification example, the human detection sensor 402 is attached to each of the pair of holding bodies 100. However, the human detection sensor 402 may be attached to only one of the pair of holding bodies 100. In other words, the human detection sensor 402 can be attached to at least one of the pair of holding bodies 100. Further, a position in which the human detection sensor 402 is attached is not limited to the position illustrated in FIG. 7.

Figure 8:
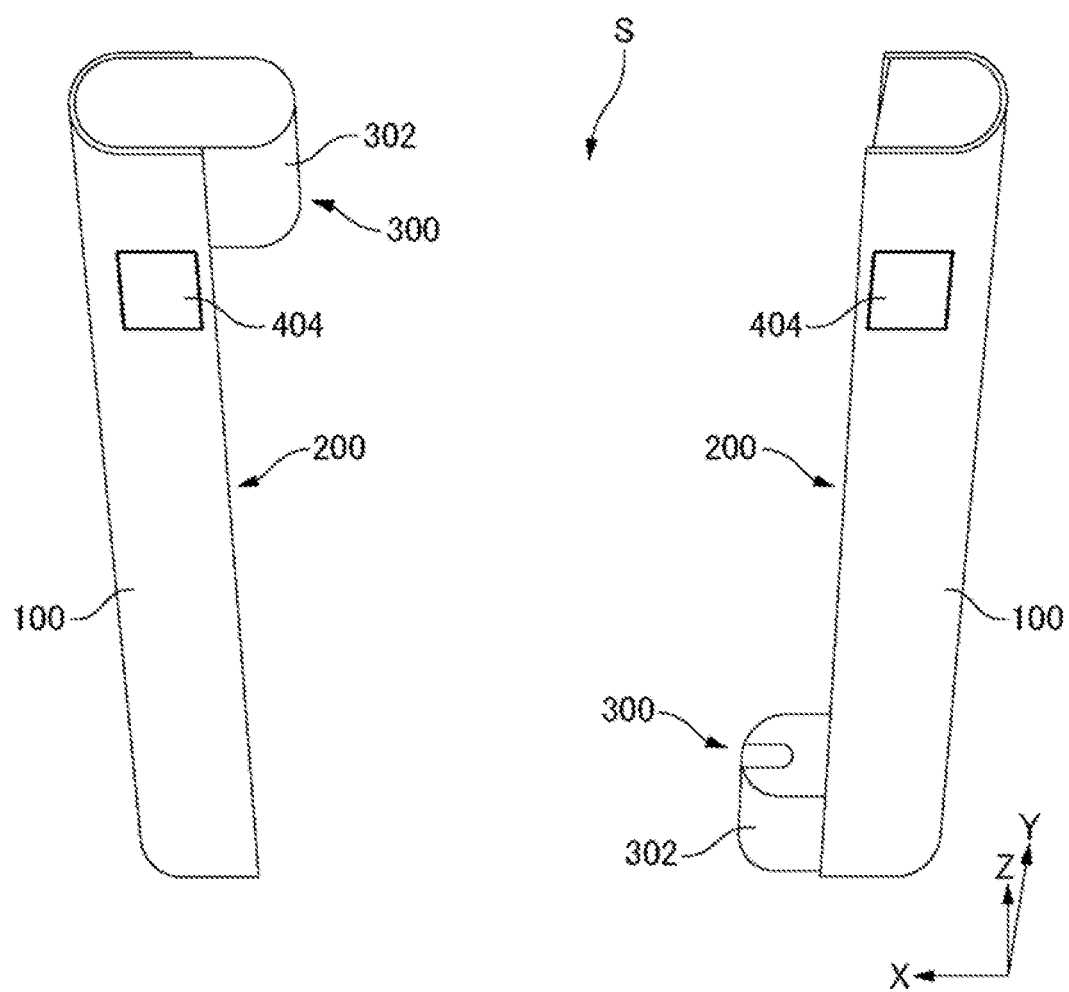
FIG. 8 is a diagram illustrating a fourth modification example of FIG. 2.

FIG. 8 is a diagram illustrating a fourth modification example of FIG. 2.

The object recognition device 10 further includes a display unit 404. The display unit 404 faces the front (negative direction of the third direction Z) of the object recognition device 10. The display unit 404 is various displays, for example, a liquid crystal display and an organic electroluminescent (EL) display. Further, the display unit 404 may be a touch screen. When the display unit 404 is a touch screen, a user of the object recognition device 10 can provide an instruction for operating the object recognition device 10 to the object recognition device 10 by using the display unit 404.

An orientation of an image displayed by the display unit 404 can be switched according to a posture of the holding body 100 to which the display unit 404 is attached. The orientation of an image displayed by the display unit 404 means, for example, which direction a predetermined reference direction (for example, an upward direction or a downward direction of the image displayed by the display unit 404) of the image displayed by the display unit 404 is oriented with respect to a predetermined position (for example, one end of the holding body 100 on which the optical sensor 300 is provided) of the holding body 100. The posture of the holding body 100 means, for example, whether a predetermined position (for example, one end of the holding body 100 on which the optical sensor 300 is provided) of the holding body 100 is oriented upward (positive direction of the second direction Y) or downward (negative direction of the second direction Y) of the vertical direction (second direction Y), is oriented in the horizontal direction (first direction X), or is oriented in an oblique direction from the vertical direction (second direction Y) or the horizontal direction (first direction X). The posture of the holding body 100 is detected by, for example, a sensor (for example, a gyro sensor attached to the holding body 100) that detects a posture of the holding body 100.

If, for example, an orientation of an image displayed by the display unit 404 is not switched according to a posture of the holding body 100, and an upward direction of the image displayed by the display unit 404 is oriented toward one end of the holding body 100 on which the optical sensor 300 is provided, the image displayed by the display unit 404 attached to the holding body 100 on a left side (positive direction side of the first direction X) as viewed from the front (negative direction of the third direction Z) of the space S is displayed in an appropriate orientation, but the image displayed by the display unit 404 attached to the holding body 100 on a right side (negative direction side of the first direction X) as viewed from the front (negative direction of the third direction Z) of the space S is displayed upside down. In contrast, in the present example embodiment, an orientation of an image displayed by the display unit 404 attached to the holding body 100 on the right side (negative direction side of the first direction X) as viewed from the front (negative direction of the third direction Z) of the space S is switched according to a posture of the holding body 100, and is not displayed upside down.

In the present modification example, the display unit 404 is attached to each of the pair of holding bodies 100. However, the display unit 404 may be attached to only one of the pair of holding bodies 100. In other words, the display unit 404 can be attached to at least one of the pair of holding bodies 100. Further, a position in which the display unit 404 is attached is not limited to the position illustrated in FIG. 8.

Figure 9:
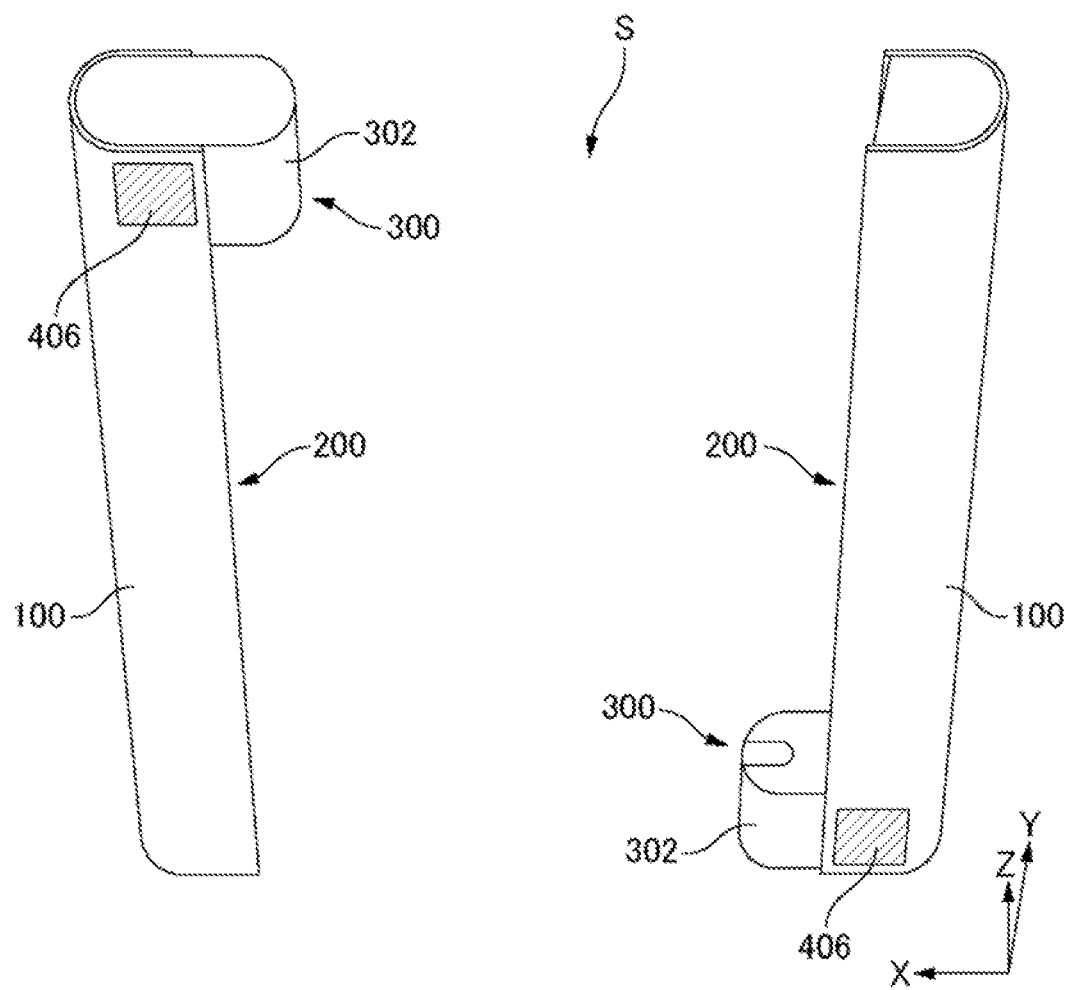
FIG. 9 is a diagram illustrating a fifth modification example of FIG. 2.

FIG. 9 is a diagram illustrating a fifth modification example of FIG. 2.

The object recognition device 10 further includes a sound sensor 406. The sound sensor 406 is, for example, a microphone. The object recognition device 10 can perform processing below, for example, by using a detection result of the sound sensor 406.

For example, at an automated store, the sound sensor 406 may detect a sound generated at a time of settlement of an article such as a product. In other words, when the sound sensor 406 detects a sound generated at a time of settlement of an article such as a product, the object recognition device 10 can determine that the settlement of an article such as a product is completed, and when the sound sensor 406 does not detect a sound generated at a time of settlement of an article such as a product, the object recognition device 10 can determine that the settlement of an article such as a product is not completed.

Further, the sound sensor 406 may detect various abnormal sounds such as an abnormal sound related to an article such as a product, and an abnormal sound in a store. An abnormal sound related to an article such as a product includes, for example, a sound generated when an article such as a product is broken. The abnormal sounds can be stored in advance in the object recognition device 10 or an external device (for example, a server) that can communicate with or be connected to the object recognition device 10. The object recognition device 10 can determine an abnormal sound related to an article such as a product by referring to the stored sound. Further, an abnormal sound related to an article such as a product may further include, for example, a sound generated when a fixture used together with an article such as a product is broken. Further, an abnormal sound in a store includes, for example, a scream, a sound of a fight, an angry voice, a burglar alarm, and the like near the object recognition device 10.

Furthermore, the sound sensor 406 may detect an entry sound of a customer.

Furthermore, the sound sensor 406 may detect a sound (for example, a voice) of an instruction for operating the object recognition device 10. In this case, for example, various types of processing (for example, settlement of an article such as a product) of the object recognition device 10 can be performed by a sound such as a voice without using the display unit 404 (touch screen).

In the present modification example, the sound sensor 406 is attached to each of the pair of holding bodies 100. However, the sound sensor 406 may be attached to only one of the pair of holding bodies 100. In other words, the sound sensor 406 can be attached to at least one of the pair of holding bodies 100. Further, a position in which the sound sensor 406 is attached is not limited to the position illustrated in FIG. 9. Further, when the sound sensor 406 is attached to both of the pair of holding bodies 100, the two sound sensors 406 may be disposed in such a way as to detect a stereo sound.

Figure 10:
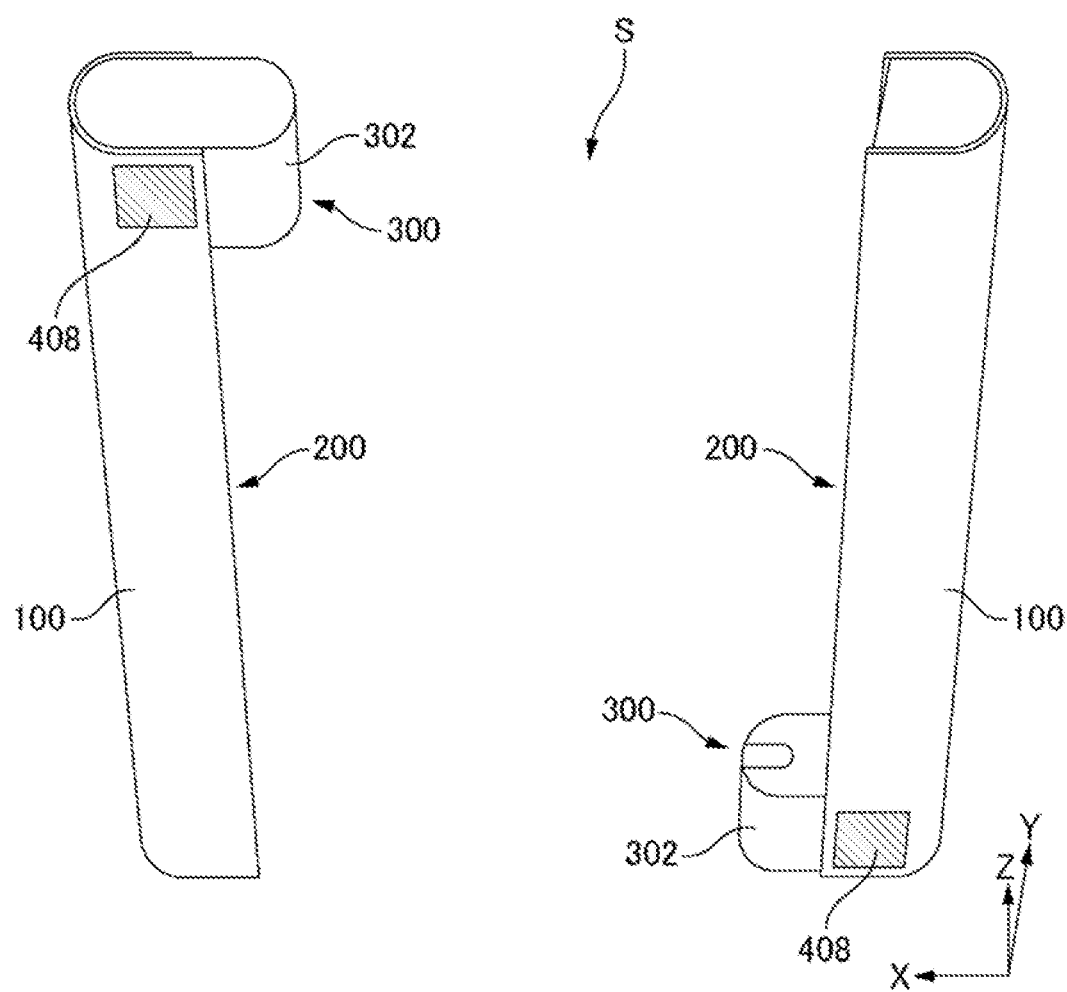
FIG. 10 is a diagram illustrating a sixth modification example of FIG. 2.

FIG. 10 is a diagram illustrating a sixth modification example of FIG. 2.

The object recognition device 10 further includes a sound source 408. The sound source 408 is, for example, a speaker. The object recognition device 10 can perform processing below, for example, by using the sound source 408.

For example, the sound source 408 outputs a sound (for example, a voice) for assisting in use of the object recognition device 10 by a user (for example, a customer of a store). For example, at an automated store, the sound source 408 outputs a sound (for example, a voice) that prompts settlement when the sound sensor 406 described above does not detect a sound generated at a time of the settlement of an article such as a product.

Further, for example, the sound source 408 may output various sounds (for example, a sound of a burglar alarm) according to an abnormal sound when the sound sensor 406 described above detects various abnormal sounds such as an abnormal sound related to an article such as a product, and an abnormal sound in a store.

Further, the sound source 408 may output a sound (for example, a voice) indicating attribute information (for example, a use-by date of a product) about an article such as a product according to various detection results (for example, a detection result of the optical sensor 300 or a detection result of a depth sensor 410 described later) of the object recognition device 10.

In the present modification example, the sound source 408 is attached to each of the pair of holding bodies 100. However, the sound source 408 may be attached to only one of the pair of holding bodies 100. In other words, the sound source 408 can be attached to at least one of the pair of holding bodies 100. Further, a position in which the sound source 408 is attached is not limited to the position illustrated in FIG. 10. Further, when the sound sources 408 is attached to both of the pair of holding bodies 100, the two sound sources 408 may be disposed in such a way as to form a stereo sound.

Figure 11:
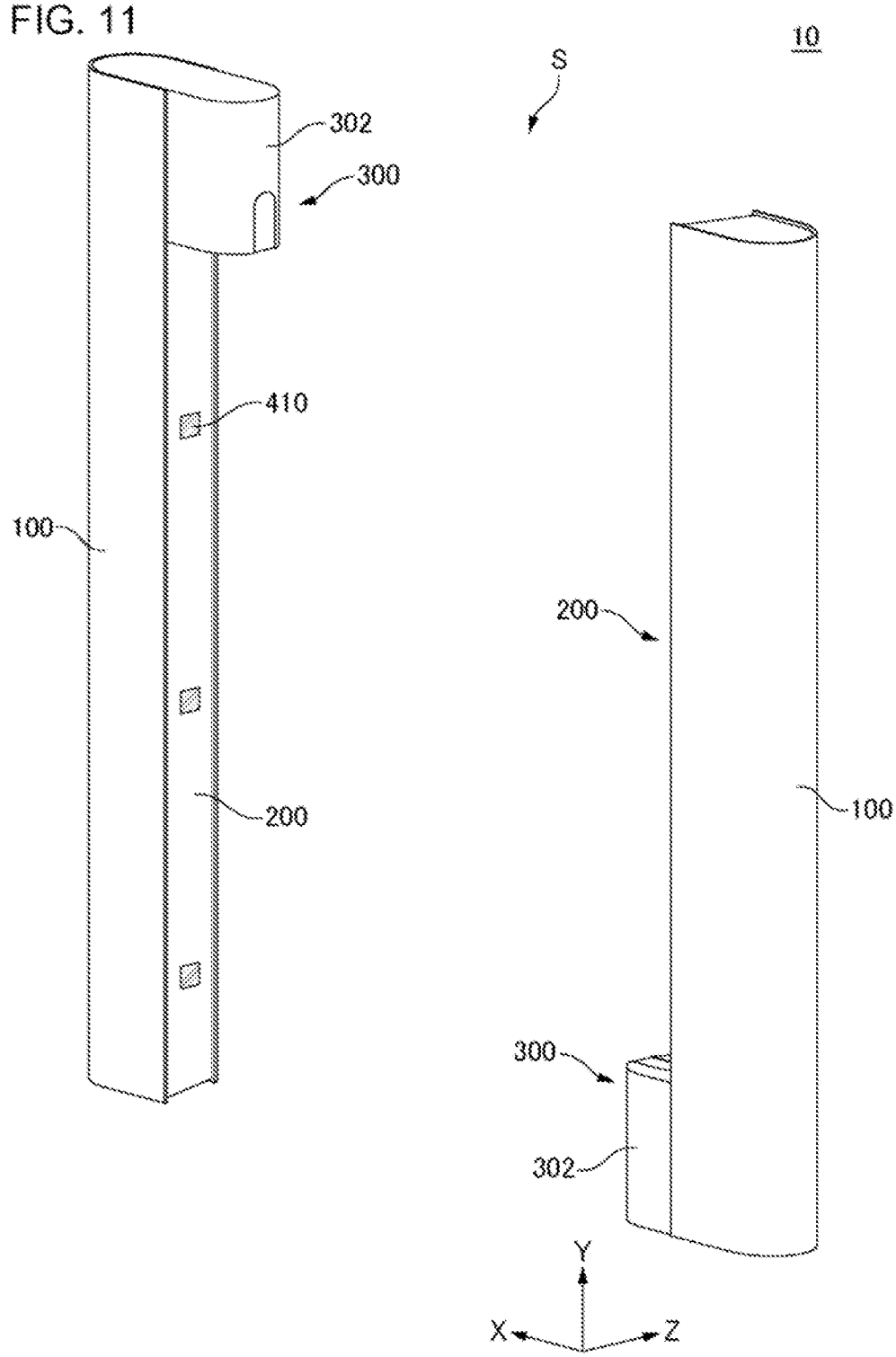
FIG. 11 is a diagram illustrating a seventh modification example of FIG. 2.

FIG. 11 is a diagram illustrating a seventh modification example of FIG. 2.

The object recognition device 10 includes a depth sensor 410. The depth sensor 410 is, for example, a depth camera. In the present example embodiment, a plurality of the depth sensors 410 are attached to each of the holding bodies 100, and the plurality of depth sensors 410 attached to each of the holding bodies 100 are aligned in the one direction (second direction Y) described above of each of the holding bodies 100. A detection range of each of the depth sensors 410 faces the back (positive direction of the third direction Z) of the space S. In this case, a position, in the left-right direction (first direction X) of the space S, of an object located at the back (positive direction of the third direction Z) of the space S can be accurately determined as compared to a case where the depth sensor 410 is not used.

As in a third example embodiment (FIG. 17) described later, when a housing portion 22 is disposed at the back (positive direction of the third direction Z) of the space S, each of the depth sensors 410 attached to each of the holding body 100 can be provided for each shelf of the housing portion 22 in which an article such as a product is housed. In this case, a position in the left-right direction (first direction X) of an article such as a product on each shelf of the housing portion 22 can be accurately determined as compared to a case where the depth sensor 410 is not used.

Note that, the depth sensor 410 may be attached to only one of the pair of holding bodies 100. In other words, the depth sensor 410 can be attached to at least one of the pair of holding bodies 100. Further, a position in which the depth sensor 410 is attached is not limited to the position illustrated in FIG. 11. Further, the number of the depth sensor 410 attached to each of the holding bodies 100 may be only one. In other words, at least one depth sensor 410 can be attached to at least one of the pair of holding bodies 100.

Figure 12:
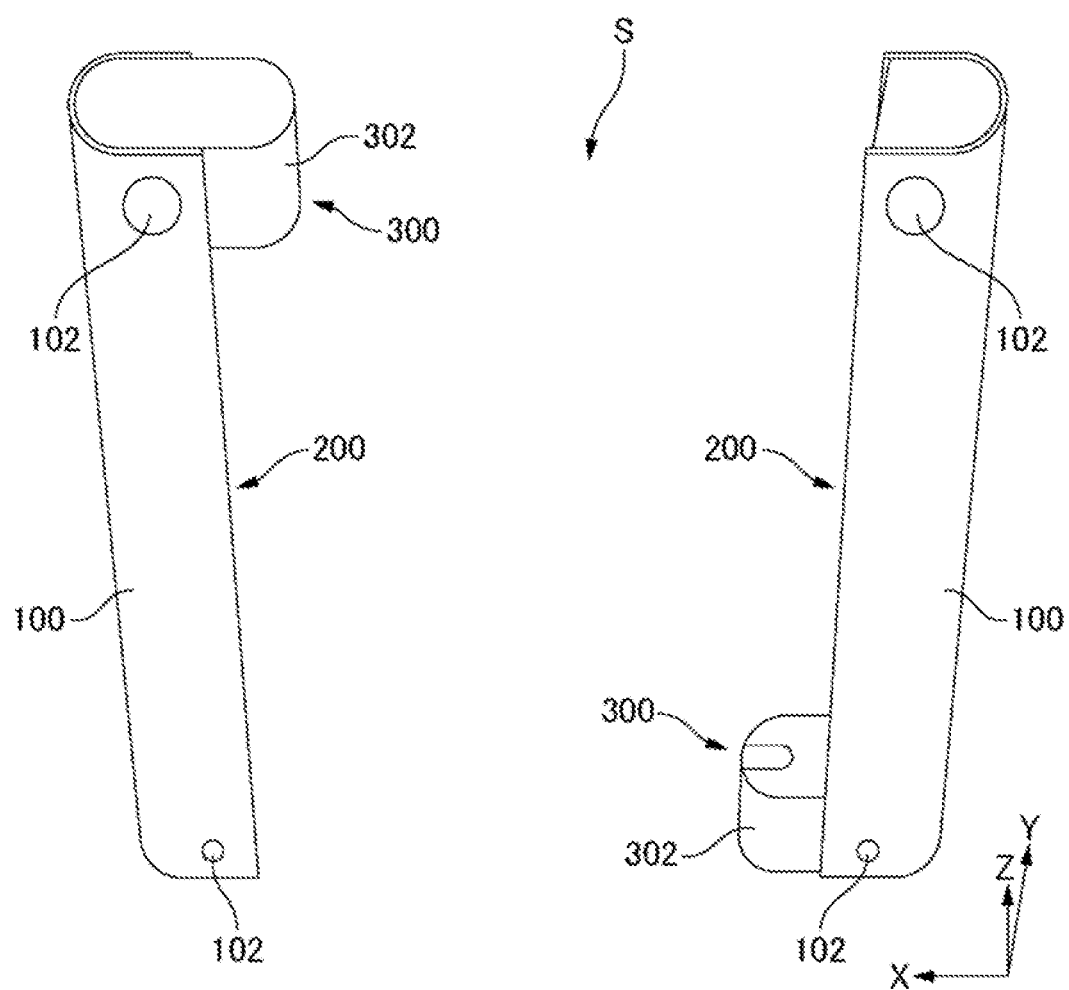
FIG. 12 is a diagram illustrating an eighth modification example of FIG. 2.

FIG. 12 is a diagram illustrating an eighth modification example of FIG. 2.

A hole 102 for discharging heat generated from an element (for example, the light source 200 or the optical sensor 300) attached to each of the holding bodies 100 is formed in each of an upper portion (portion on the positive direction side of the second direction Y) and a lower portion (portion on the negative direction side of the second direction Y) of each of the holding bodies 100. The hole 102 formed in each of the upper portion (portion on the positive direction side of the second direction Y) and the lower portion (portion on the negative direction side of the second direction Y) of each of the holding bodies 100 can discharge heat by using convection. Further, an area of the hole 102 formed in the upper portion (portion on the positive direction side of the second direction Y) of each of the holding bodies 100 is greater than an area of the hole 102 formed in the lower portion (portion on the negative direction side of the second direction Y) of each of the holding bodies 100. In this case, as compared to a case where an area of the hole 102 formed in the upper portion (portion on the positive direction side of the second direction Y) of each of the holding bodies 100 is equal to or less than an area of the hole 102 formed in the lower portion (portion on the negative direction side of the second direction Y) of each of the holding bodies 100, the amount of heat discharged from the hole 102 formed in the upper portion (portion on the positive direction side of the second direction Y) of each of the holding bodies 100 can be increased.

Figure 13:
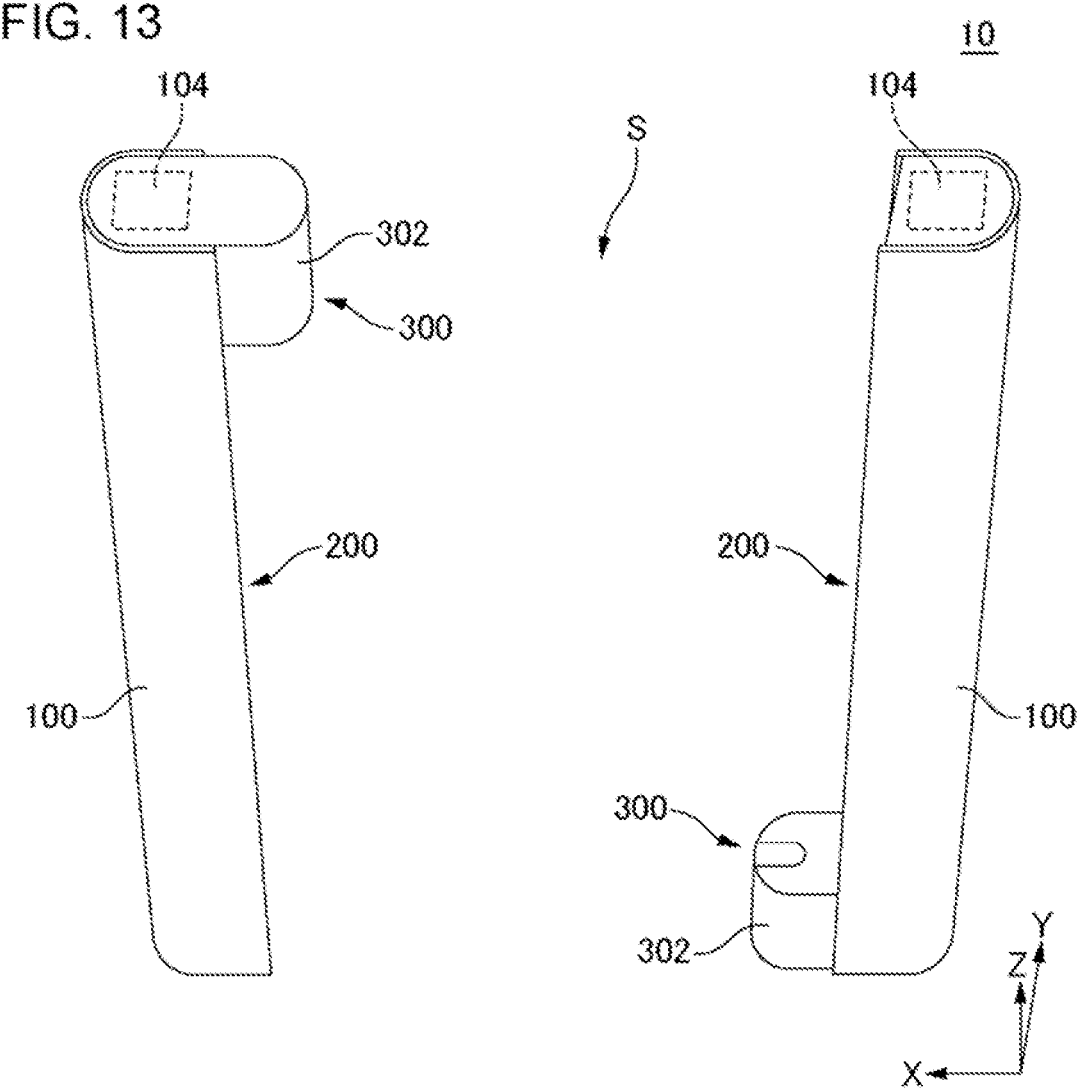
FIG. 13 is a diagram illustrating a ninth modification example of FIG. 2.

FIG. 13 is a diagram illustrating a ninth modification example of FIG. 2.

A heat radiation member 104 is provided on an upper portion (portion on the positive direction side of the second direction Y) (upper portion inside each of the holding bodies 100) of each of the holding bodies 100. The heat radiation member 104 is, for example, a metal plate or a heat radiation sheet. The heat radiation member 104 can release, to the outside of each of the holding bodies 100, heat generated from an element (for example, the light source 200 or the optical sensor 300) attached to each of the holding bodies 100. When it is considered that heat generated from an element (for example, the light source 200 or the optical sensor 300) attached to each of the holding bodies 100 tends to go upward (positive direction of the second direction Y) in the vertical direction, the heat radiation member 104 is more preferably provided on the upper portion (portion on the positive direction side of the second direction Y) of each of the holding bodies 100 than a lower portion (portion on the negative direction side of the second direction Y) of each of the holding bodies 100. However, a position in which the heat radiation member 104 is attached is not limited to the position according to the present modification example.

Figure 14:
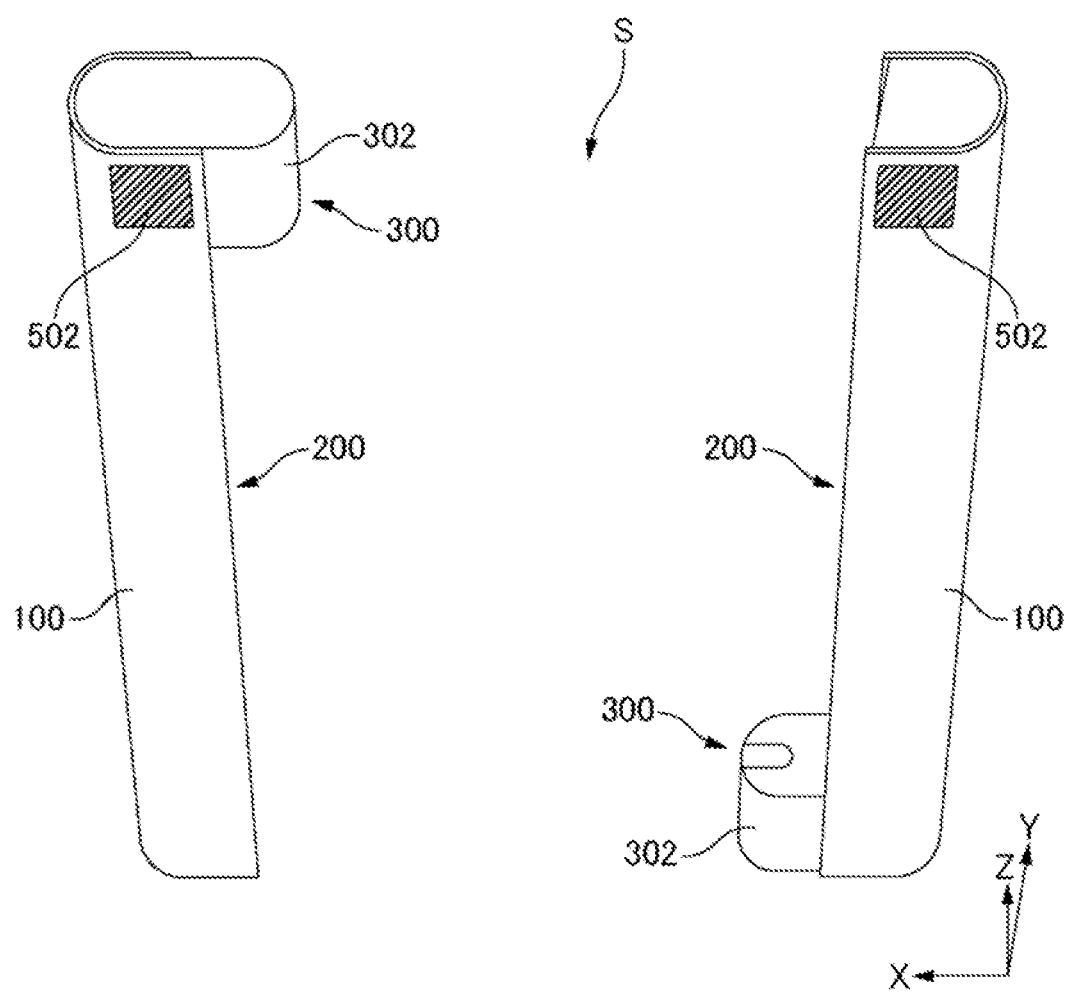
FIG. 14 is a diagram illustrating a tenth modification example of FIG. 2.

FIG. 14 is a diagram illustrating a tenth modification example of FIG. 2.

The object recognition device 10 further includes a communication unit 502. The communication unit 502 is, for example, an antenna. The object recognition device 10 can communicate with an external device (for example, a server) of the object recognition device 10 via the communication unit 502. The communication unit 502 is attached to each of the pair of holding bodies 100. Further, the communication unit 502 attached to each of the holding bodies 100 is located above (positive direction of the second direction Y) the center in the one direction (second direction Y) described above of each of the holding bodies 100. In this case, as compared to a case where the communication unit 502 attached to each of the holding bodies 100 is located below (negative direction of the second direction Y) the center in the one direction (second direction Y) described above of each of the holding bodies 100, a position of the communication unit 502 in the vertical direction (second direction Y) can be set higher, and the communication unit 502 can more easily communicate with an external device (for example, a server) of the object recognition device 10. However, the communication unit 502 attached to each of the holding bodies 100 may be located at the center in the one direction (second direction Y) described above of each of the holding bodies 100, or may be located below (negative direction of the second direction Y) the center in the one direction (second direction Y) described above of each of the holding bodies 100.

Figure 15:
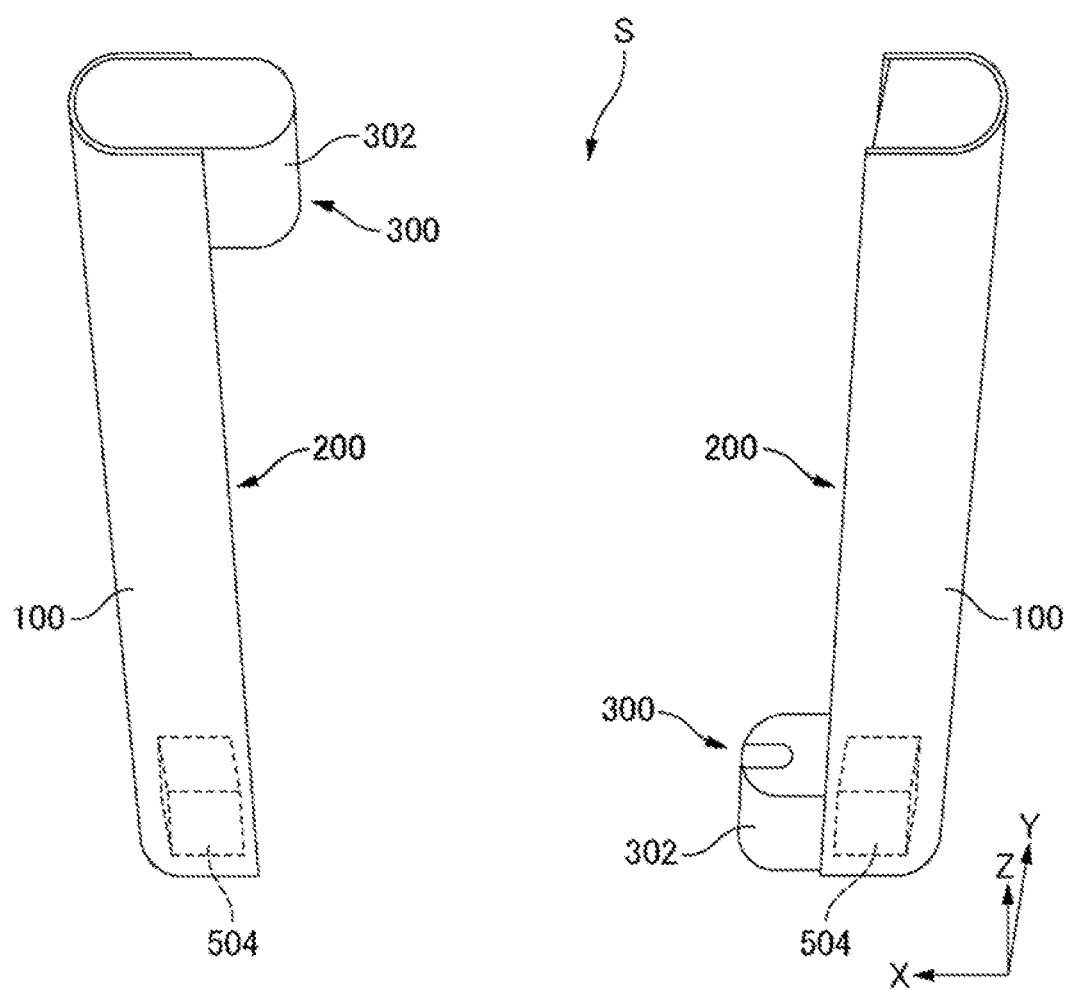
FIG. 15 is a diagram illustrating an eleventh modification example of FIG. 2.

FIG. 15 is a diagram illustrating an eleventh modification example of FIG. 2.

The object recognition device 10 further includes a power source 504. The power source 504 supplies power to an element (for example, the light source 200 or the optical sensor 300) attached to each of the holding bodies 100. The power source 504 is attached to each of the pair of holding bodies 100. Further, the power source 504 attached to each of the holding bodies 100 is located below (negative direction of the second direction Y) the center in the one direction (second direction Y) described above of each of the holding bodies 100. In this case, when a wiring line connected to the power source 504 is located near an installation surface of the object recognition device 10, a distance between the power source 504 and the wiring line connected to the power source 504 can be shortened as compared to a case where the power source 504 attached to each of the holding bodies 100 is located above (negative positive direction of the second direction Y) the center in the one direction (second direction Y) described above of each of the holding bodies 100. However, the power source 504 attached to each of the holding bodies 100 may be located at the center in the one direction (second direction Y) described above of each of the holding bodies 100, or may be located above (positive direction of the second direction Y) the center in the one direction (second direction Y) described above of each of the holding bodies 100.

In FIG. 15, the power source 504 is described, but the same as the above-described matter described by the power source 504 also applies to a communication cable connected to a connector outside the object recognition device 10.

Figure 16:
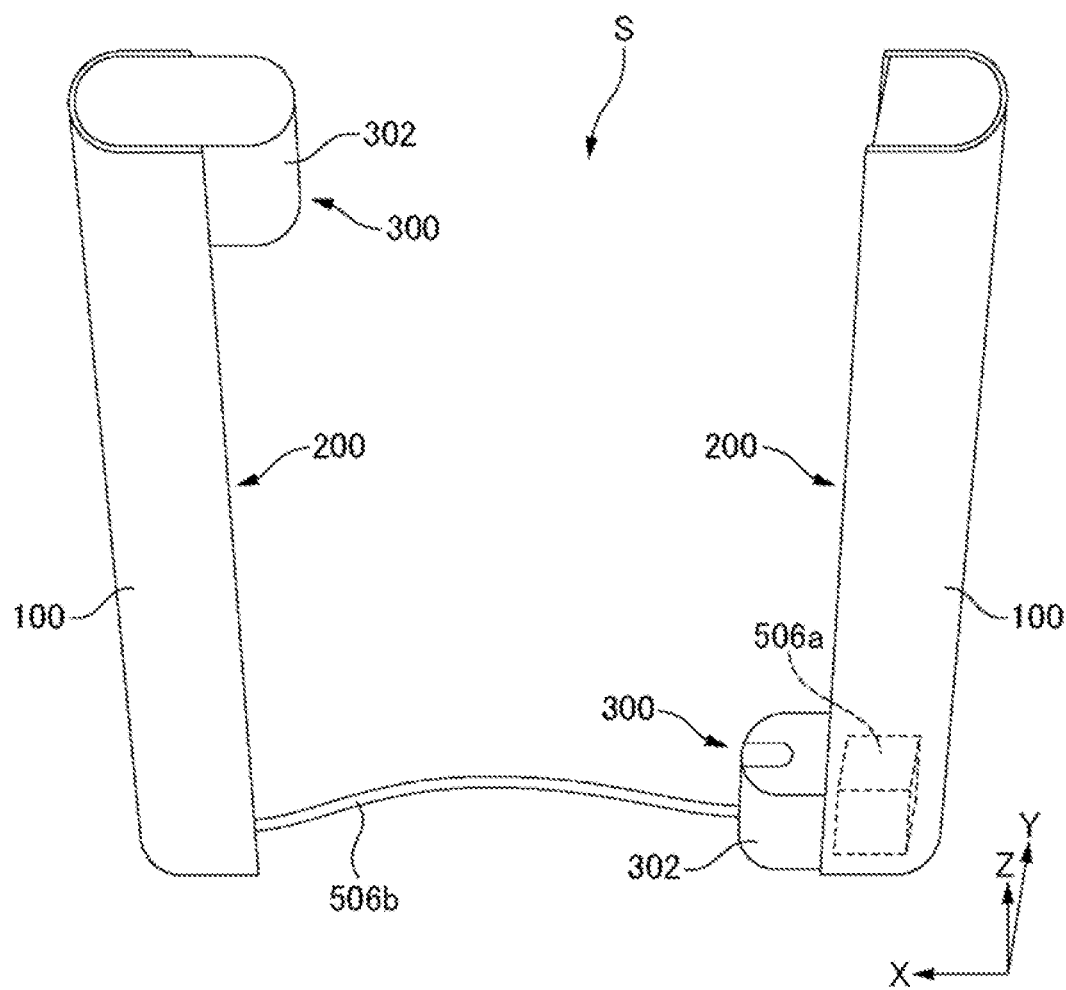
FIG. 16 is a diagram illustrating a twelfth modification example of FIG. 2.

FIG. 16 is a diagram illustrating a twelfth modification example of FIG. 2.

The object recognition device 10 includes a communication device 506a and a communication wiring line 506b. The communication device 506a is attached to the another (the holding body 100 on the negative direction side of the first direction X) of the pair of holding bodies 100. Further, the communication device 506a is electrically connected to the optical sensor 300 attached to the another (the holding body 100 on the negative direction side of the first direction X) of the pair of holding bodies 100. The communication wiring line 506b is connected to the one (the holding body 100 on the negative direction side of the first direction X) of the pair of holding bodies 100, and to the communication device 506a attached to the another (the holding body 100 on the negative direction side of the first direction X) of the pair of holding bodies 100. Further, the communication wiring line 506b is electrically connected to the optical sensor 300 attached to the one (the holding body 100 on the positive direction side of the first direction X) of the pair of holding bodies 100. The communication device 506a communicates with an external device (for example, a computer) of the object recognition device 10. In this example, a detection result of the optical sensor 300 attached to the another (the holding body 100 on the negative direction side of the first direction X) of the pair of holding bodies 100 can be transmitted to an external device (for example, a computer) of the object recognition device 10 via the communication device 506a, and a detection result of the optical sensor 300 attached to the one (the holding body 100 on the positive direction side of the first direction X) of the pair of holding bodies 100 can be transmitted to an external device (for example, a computer) of the object recognition device 10 via the communication wiring line 506b and the communication device 506a.

Third Example Embodiment

Figure 17:
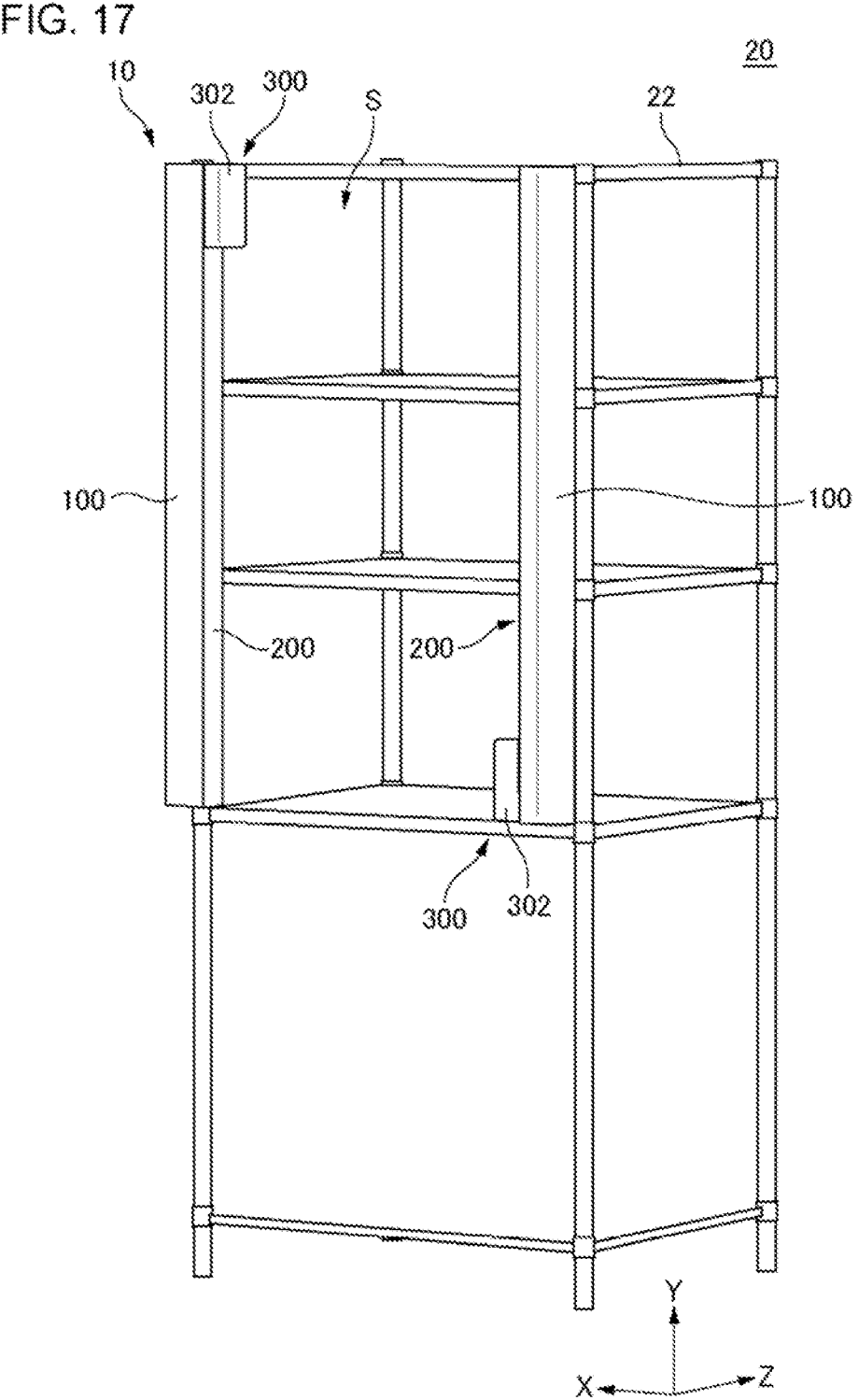
FIG. 17 is a perspective view of a housing device according to a third example embodiment.

FIG. 17 is a perspective view of a housing device 20 according to a third example embodiment.

The housing device 20 includes the housing portion 22 and an object recognition device 10. An article is housed in the housing portion 22. Specifically, the housing portion 22 is, for example, a shelf on which an article such as a product is housed in a store such as a retail store. The object recognition device 10 according to the present example embodiment is similar to the object recognition device 10 according to the second example embodiment. In other words, the object recognition device 10 includes a pair of holding bodies 100. However, the object recognition device 10 may include a single holding body 100 similarly to the object recognition device 10 according to the first example embodiment. The housing portion 22 is located at the back (positive direction of the third direction Z) of a space S between the pair of holding bodies 100. The housing portion 22 includes the holding bodies 100. In the present example embodiment, the holding body 100 is attached to a portion of a frame of the housing portion 22 extending in the up-down direction (second direction Y) of the housing device 20. In other words, the object recognition device 10 (holding body 100) is attached to the housing portion 22 being prepared in advance. However, the holding body 100 may be a portion (for example, a portion of the frame of the housing portion 22 extending in the up-down direction (second direction Y) of the housing device 20) itself of the housing portion 22. In other words, the "housing portion 22 includes the holding body 100" may mean that the holding body 100 is attached to the housing portion 22, or may mean that the holding body 100 is a portion itself of the housing portion 22.

For example, when the housing device 20 is used in a store such as a retail store, the object recognition device 10 recognizes various objects, for example, a person located near the object recognition device 10, a person located at the front (negative direction of the third direction Z) of the object recognition device 10, a hand reaching out via the space S for an article such as a product housed in the housing portion 22, an article such as a product housed in the housing portion 22 via the space S, an article such as a product taken out of the housing portion 22 via the space S, and the like. In this way, the housing device 20 (object recognition device 10) can recognize, with high sensitivity, an object (for example, an article such as a product, or a person) that is present in a specific region (for example, the space S, the front (positive direction of the third direction Z) of the space S, or the back (positive direction of the third direction Z) of the space S) with respect to the housing portion 22, or passes through a specific region (for example, the space S, the front (positive direction of the third direction Z) of the space S, or the back (positive direction of the third direction Z) of the space S) with respect to the housing portion 22.

Figure 18:
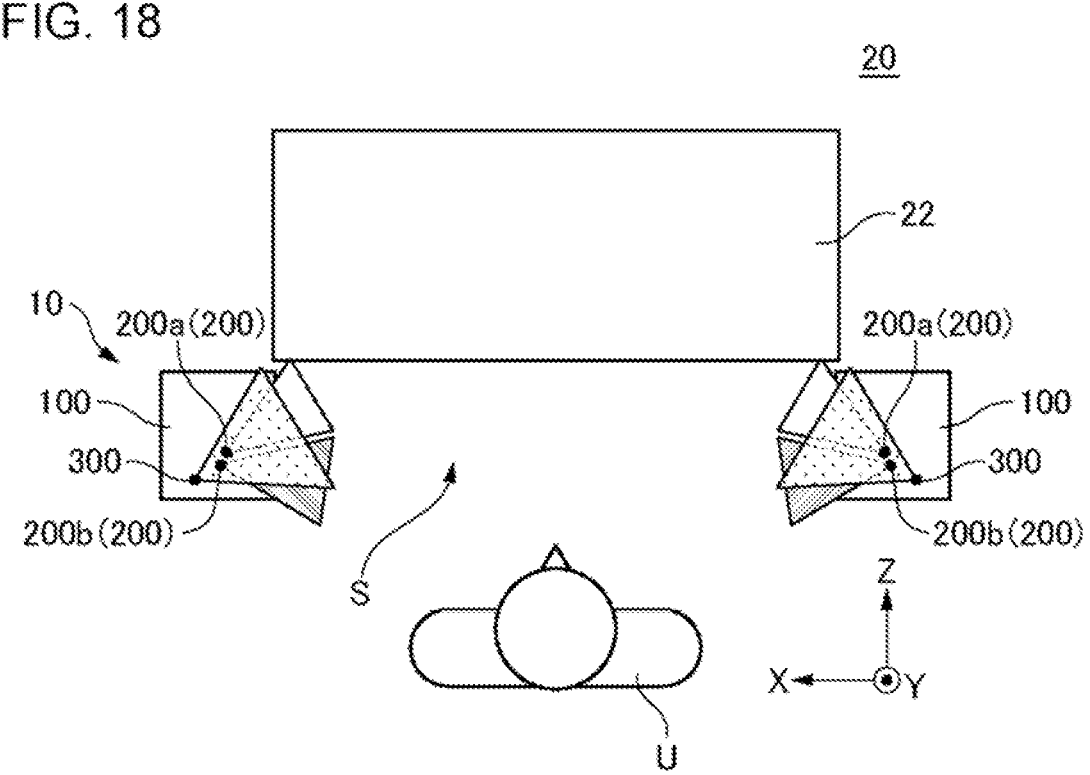
FIG. 18 is a diagram for describing a first example of a relationship between a light source and an optical sensor that are illustrated in FIG. 17.

FIG. 18 is a diagram for describing a first example of a relationship between a light source 200 and an optical sensor 300 that are illustrated in FIG. 17.

The light source 200 attached to one (the holding body 100 on the positive direction side of the first direction X) of the pair of holding bodies 100 includes a visible light source 200a and an infrared light source 200b. The light source 200 attached to another (the holding body 100 on the negative direction side of the first direction X) of the pair of holding bodies 100 also includes the visible light source 200a and the infrared light source 200b. The optical sensor 300 attached to each of the pair of holding bodies 100 can detect both of RGB light and infrared light.

In FIG. 18, a white triangle having, as one vertex, a point indicating a position of the visible light source 200a indicates an application range of visible light by the visible light source 200a. However, in an actual object recognition device 10, an application range of visible light by the visible light source 200a may reach a region farther away from the holding body 100 than the range illustrated in FIG. 18. In FIG. 18, a line-hatched triangle having, as one vertex, a point indicating a position of the infrared light source 200b indicates an application range of infrared light by the infrared light source 200b. However, in an actual object recognition device 10, an application range of infrared light by the infrared light source 200b may reach a region farther away from the holding body 100 than the range illustrated in FIG. 18. In FIG. 18, a dot-hatched triangle having, as one vertex, a point indicating a position of the optical sensor 300 indicates a visual field of the optical sensor 300. However, in an actual object recognition device 10, a visual field of the optical sensor 300 may reach a region farther away from the holding body 100 than the range illustrated in FIG. 18. The same applies to FIGS. 19 and 20 described later except for a matter particularly described below.

The application range of infrared light by the infrared light source 200b attached to each of the pair of holding bodies 100 faces the front (negative direction of the third direction Z) (side on which a person U is located) of the space S, whereas the application range of visible light by the visible light source 200a attached to each of the pair of holding bodies 100 faces the back (positive direction of the third direction Z) (side on which the housing portion 22 is located) of the space S. Therefore, by setting visible light in such a way as not to be applied too much to the person U located at the front (negative direction of the third direction Z) of the space S, the person U located at the front (negative direction of the third direction Z) of the space S can be prevented from sensing glare of visible light. The person U located at the front (negative direction of the third direction Z) of the space S can be detected mainly by infrared light rather than visible light.

Figure 19:
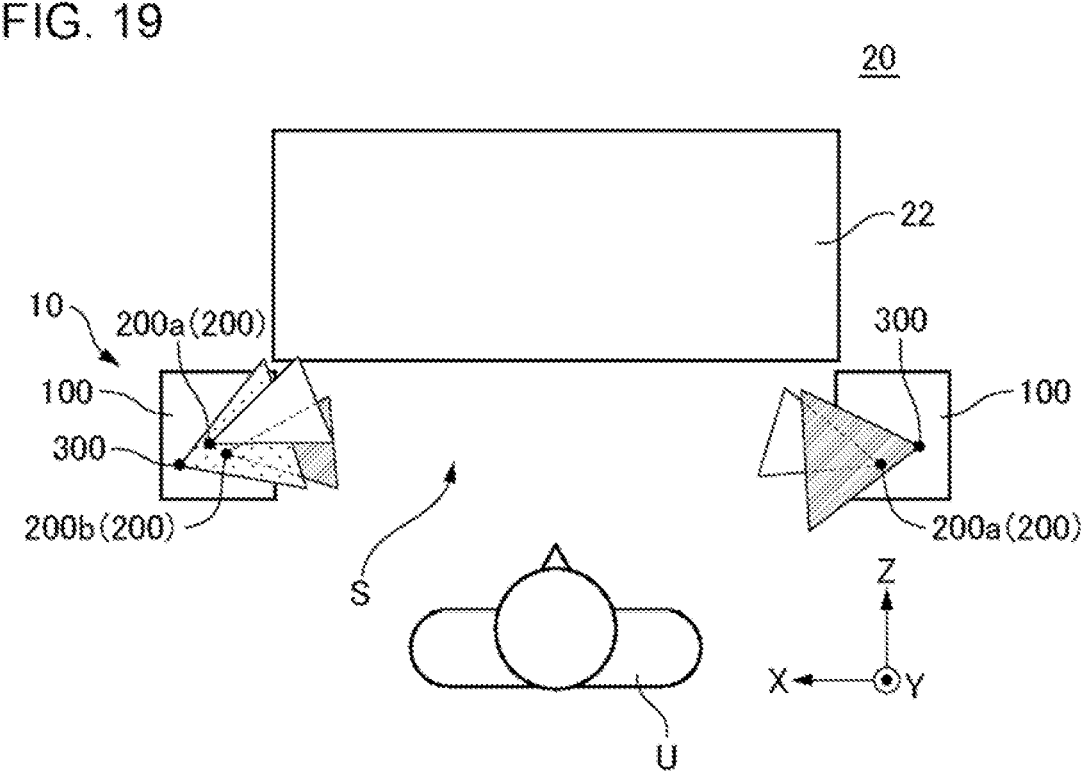
FIG. 19 is a diagram for describing a second example of a relationship between the light source and the optical sensor that are illustrated in FIG. 17.

FIG. 19 is a diagram for describing a second example of a relationship between the light source 200 and the optical sensor 300 that are illustrated in FIG. 17. Note that, in FIG. 19, a dot-hatched triangle having, as one vertex, a point indicating a position of the optical sensor 300 on the positive direction side of the first direction X among the two optical sensors 300 indicates a visual field for RGB light of the optical sensor 300 on the positive direction side of the first direction X among the two optical sensors 300. Further, in FIG. 19, a line-hatched triangle having, as one vertex, a point indicating a position of the optical sensor 300 on the negative direction side of the first direction X among the two optical sensors 300 indicates a visual field for infrared light of the optical sensor 300 on the negative direction side of the first direction X among the two optical sensors 300. The visual fields may reach a region farther away from the holding body 100 than the ranges illustrated in FIG. 19.

The light source 200 (infrared light source 200b) that emits infrared light is attached to the one (the holding body 100 on the positive direction side of the first direction X) of the pair of holding bodies 100, whereas the light source 200 that emits infrared light is not attached to the another (the holding body 100 on the negative direction side of the first direction X) of the pair of holding bodies 100. Meanwhile, the optical sensor 300 that detects infrared light is attached to the another (the holding body 100 on the negative direction side of the first direction X) of the pair of holding bodies 100. In this case, the optical sensor 300 attached to the another (the holding body 100 on the negative direction side of the first direction X) of the pair of holding bodies 100 can detect that infrared light emitted from the infrared light source 200b attached to the one (the holding body 100 on the positive direction side of the first direction X) of the pair of holding bodies 100 is blocked by an object such as the person U and an article.

Figure 20:
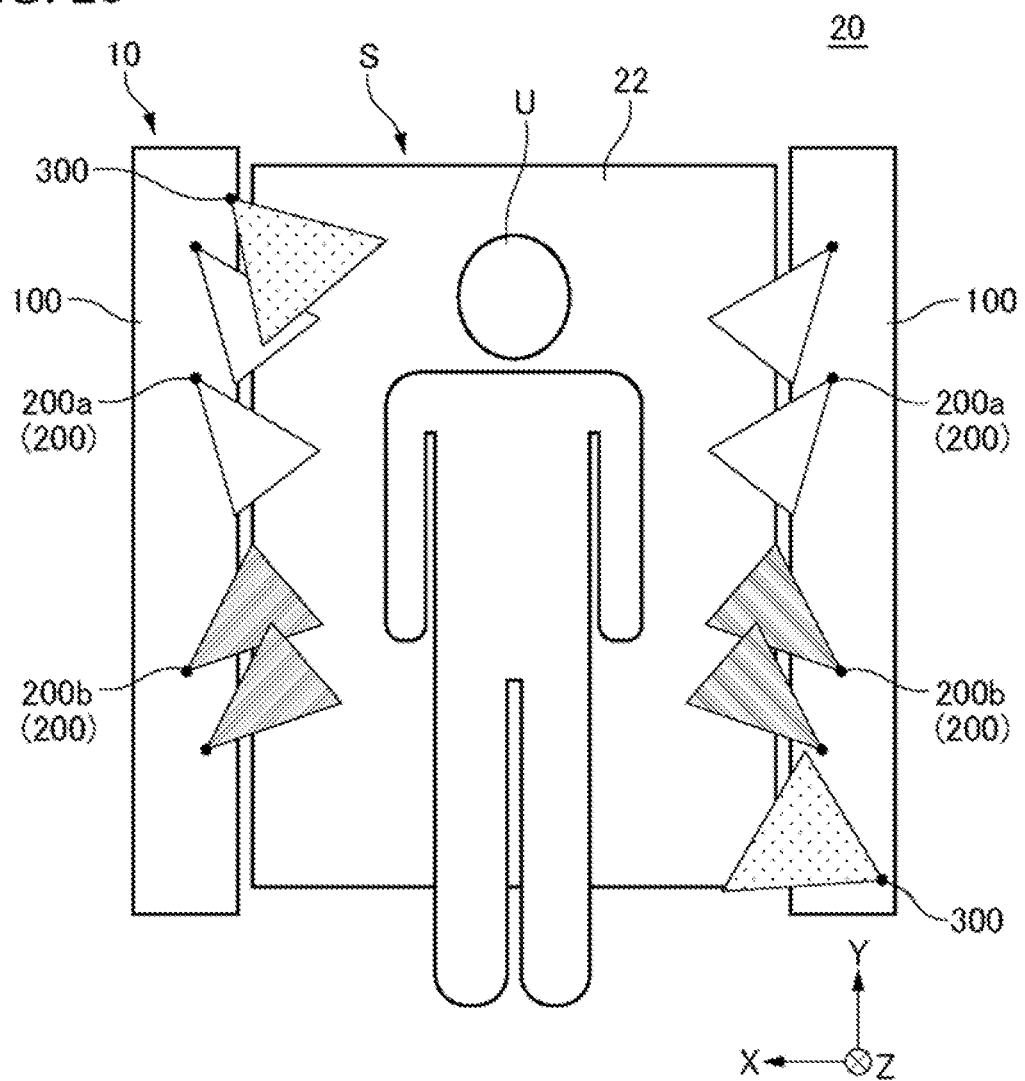
FIG. 20 is a diagram for describing a third example of a relationship between the light source and the optical sensor that are illustrated in FIG. 17.

FIG. 20 is a diagram for describing a third example of a relationship between the light source 200 and the optical sensor 300 that are illustrated in FIG. 17. Note that, a length of each of the pair of holding bodies 100 in the up-down direction (second direction Y) of the space S in FIG. 20 is longer than a length of each of the pair of holding bodies 100 in the up-down direction (second direction Y) of the space S in FIG. 17. In FIG. 20, a lower end (end on the negative direction side of the second direction Y) of each of the pair of holding bodies 100 reaches a height (height of, for example, equal to or less than 50 cm upward (positive direction of the second direction Y) from a surface on which the housing device 20 is installed) approximately below the knee of the person U located at the front (negative direction of the third direction Z) of the space S.

In each of the pair of holding bodies 100, the visible light source 200a is located above (positive direction of the second direction Y) the infrared light source 200b. More specifically, in each of the pair of holding bodies 100, the visible light source 200a is located in such a way as to be shifted above (positive direction of the second direction Y) the center in an extending direction (second direction Y) of each of the holding bodies 100, whereas the infrared light source 200b is located in such a way as to be shifted below (negative direction of the second direction Y) the center in the extending direction (second direction Y) of each of the holding bodies 100. Further, the optical sensor 300 attached to each of the pair of holding bodies 100 can detect both of RGB light and infrared light.

Visible light is applied from above (positive direction of the second direction Y) the person U located at the front (negative direction of the third direction Z) of the space S, and infrared light is applied from below (negative direction of the second direction Y) the person U located at the front (negative direction of the third direction Z) of the space S. In this case, for example, as compared to a case where visible light is applied from below (negative direction of the second direction Y) the person U located at the front (negative direction of the third direction Z) of the space S, the person U located at the front (negative direction of the third direction Z) of the space S can be prevented from sensing glare of visible light.

While the example embodiments and the modification examples of the present invention have been described with reference to the drawings, the example embodiments and the modification examples are only exemplification of the present invention, and various configurations other than the above-described example embodiments and modification examples can also be employed.

A part or the whole of the above-described example embodiments may also be described as in supplementary notes below, which is not limited thereto.

1. A housing device, including:
    a housing portion including a holding body extending in one direction, and in which an article is housed;
    a light source that is attached to the holding body along the one direction, and applies light toward at least a part of a space located on a side of the holding body with respect to the one direction of the holding body, a front of the space, and a back of the space; and
    an optical sensor that is attached to the holding body, and has at least a part of a visual field facing in at least a part of the space, the front of the space, and the back of the space.
2. The housing device according to supplementary note 1, wherein
    the visual field of the optical sensor faces, from a position in which the optical sensor is located toward the space, the front of the space, or the back of the space, in a direction obliquely intersecting the one direction of the holding body.
3. The housing device according to supplementary note 1 or 2, wherein
    the holding body includes a pair of the holding bodies facing each other across the space,
    the light source is attached to at least one of the pair of the holding bodies, and
    the optical sensor is attached to at least another of the pair of the holding bodies.
4. The housing device according to supplementary note 3, wherein
    the optical sensor attached to one of the pair of the holding bodies and the optical sensor attached to another of the pair of the holding bodies face each other in a direction obliquely intersecting the one direction of the one or the another of the pair of the holding bodies.
5. The housing device according to any one of supplementary notes 1 to 4, wherein
    the holding body is attached to the housing portion.

What is claimed is:
1. A housing device, comprising:
    a housing portion including a pair of holding bodies and in which an article is housed, the holding bodies extending in one direction and facing each other across a space along one direction parallel to sides of the pair of the holding bodies;
    a plurality of light sources that are attached to a first holding body of the pair of holding bodies along the one direction, and that apply light toward at least a part of the space, a front of the space, and a back of the space;
    an optical sensor that is attached to a second holding body of the pair of holding bodies, and that has at least a part of a visual field facing in at least a part of the space, the front of the space, and the back of the space; and
    a pair of guide members that can expand and contract for alignment of the pair of holding bodies and that are provided so as to intersect each other at centers thereof, wherein
    first and second ends of a first guide member of the pair of guide members are respectively fixed to an upper end of the first holding body and a lower end of the second holding body, and
    first and second ends of a second guide member of the pair of guide members are respectively fixed to an upper end of the second holding body and a lower end of the first holding body.
2. The housing device according to claim 1, wherein
the visual field of the optical sensor faces, from a position in which the optical sensor is located toward the space, the front of the space or the back of the space, in a direction obliquely intersecting the one direction of the pair of holding bodies.
3. The housing device according to claim 1, wherein
the optical sensor is a second optical sensor,
the housing device further comprises a first optical sensor that is attached to the first holding body, and
the first and second optical sensors face each other in a direction obliquely intersecting the one direction.
4. The housing device according to claim 1, wherein
the housing portion has a length direction along the one direction.
5. The housing device according to claim 1, wherein
the optical sensor includes a camera which recognize an object, and
the object includes a hand reaching out via the space for the article, the article housed in the housing portion via the space, the article taken out of the housing portion via the space.
6. The housing device according to claim 5, wherein
the plurality of light sources includes a visible light source, and
an application range of visible light by the visible light source faces a side on which the housing portion is located.

* * * * *